(12) United States Patent
Nikaido

(10) Patent No.: US 8,774,492 B2
(45) Date of Patent: Jul. 8, 2014

(54) METHOD, APPARATUS AND PROGRAM FOR PROCESSING A CONTRAST PICTURE IMAGE OF A SEMICONDUCTOR ELEMENT

(75) Inventor: Masafumi Nikaido, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 294 days.

(21) Appl. No.: 13/237,472

(22) Filed: Sep. 20, 2011

(65) Prior Publication Data
US 2012/0076394 A1 Mar. 29, 2012

(30) Foreign Application Priority Data

Sep. 24, 2010 (JP) .................................. 2010-214228

(51) Int. Cl.
*G06K 9/00* (2006.01)
(52) U.S. Cl.
USPC ........................................................ 382/145
(58) Field of Classification Search
None
See application file for complete search history.

(56) References Cited

U.S. PATENT DOCUMENTS

| | | | |
|---|---|---|---|
| 5,502,306 A | 3/1996 | Meisburger et al. | |
| 5,887,080 A | 3/1999 | Tsubusaki et al. | |
| 6,111,981 A | 8/2000 | Tsubusaki et al. | |
| 6,493,082 B2 * | 12/2002 | Nara et al. | 356/394 |
| 6,621,571 B1 * | 9/2003 | Shishido et al. | 356/237.5 |
| 2002/0141632 A1 * | 10/2002 | Engelbart et al. | 382/141 |
| 2003/0076989 A1 * | 4/2003 | Maayah et al. | 382/145 |
| 2004/0228515 A1 * | 11/2004 | Okabe et al. | 382/145 |

(Continued)

FOREIGN PATENT DOCUMENTS

| | | |
|---|---|---|
| JP | 5-258703 A | 10/1993 |
| JP | 07-220077 A | 8/1995 |

(Continued)

OTHER PUBLICATIONS

John Canny, A Computational Approach to Edge Detection, IEEE Transactions on Pattern Analysis and Machine Intelligence, vol. PAMI-8, No. 6, Nov. 1986, pp. 679-698.

(Continued)

*Primary Examiner* — Atiba O Fitzpatrick
*Assistant Examiner* — Thomas A James
(74) *Attorney, Agent, or Firm* — Foley & Lardner LLP

(57) ABSTRACT

A method for processing a contrast picture image of a semiconductor element. The method comprises; a color grade number reducing processing that automatically reduces number of color grades of the contrast picture image of the semiconductor element, obtained from a device for analysis, in keeping with the contrast of the contrast picture image; an interconnect contrast extraction processing that classifies pixels contained in the contrast picture image, whose number of color grades has been reduced, in accordance with a preset contrast threshold value as reference, to extract an interconnect pattern fractionated into a plurality of number of contrasts; and a shift processing that removes noise contained in a contour portion of the interconnect pattern by shifting the contour portion; whereby an interconnect pattern contained in the contrast image of the semiconductor element obtained from the device for analysis is fractionated into a plurality of preset contrasts to be extracted.

17 Claims, 18 Drawing Sheets

(56) References Cited

U.S. PATENT DOCUMENTS

| | | | |
|---|---|---|---|
| 2005/0058334 A1* | 3/2005 | Armstrong | 382/141 |
| 2005/0175233 A1* | 8/2005 | Yoneyama et al. | 382/145 |
| 2006/0115143 A1* | 6/2006 | Auerbach | 382/149 |
| 2006/0165272 A1* | 7/2006 | Saloma et al. | 382/145 |
| 2006/0245637 A1* | 11/2006 | Prince | 382/150 |
| 2008/0063255 A1* | 3/2008 | Usui et al. | 382/141 |
| 2008/0279444 A1* | 11/2008 | Fischer et al. | 382/145 |
| 2009/0236523 A1 | 9/2009 | Nakamura | |
| 2010/0021044 A1* | 1/2010 | Zandifar | 382/145 |
| 2010/0021048 A1* | 1/2010 | Zandifar et al. | 382/149 |
| 2010/0027885 A1* | 2/2010 | Aragaki et al. | 382/167 |
| 2010/0239157 A1* | 9/2010 | O'Dell et al. | 382/145 |
| 2011/0170765 A1* | 7/2011 | Maeda et al. | 382/145 |
| 2012/0076392 A1* | 3/2012 | Zandifar et al. | 382/141 |
| 2012/0162405 A1* | 6/2012 | Inagaki et al. | 348/87 |
| 2012/0189189 A1* | 7/2012 | Doe et al. | 382/149 |

FOREIGN PATENT DOCUMENTS

| | | |
|---|---|---|
| JP | 2000-172847 A | 6/2000 |
| JP | 2002-314833 A | 10/2002 |
| JP | 2006-286685 A | 10/2006 |
| JP | 2009-231490 A | 10/2009 |
| JP | 2009-252414 A | 10/2009 |

OTHER PUBLICATIONS

G. A. Gordon et al., Ultrasonic C-Scan Imaging for Material Characterization, Ultrasonics, vol. 31, No. 5, 1993, pp. 373-380.

* cited by examiner

1 : PROCESSOR FOR PROCESSING CONTRAST PICTURE IMAGE
OF SEMICONDUCTOR ELEMENT

30 : COMPUTER

METHOD, APPARATUS AND PROGRAM FOR PROCESSING A CONTRAST PICTURE IMAGE OF A SEMICONDUCTOR ELEMENT

REFERENCE TO RELATED APPLICATION

This application is based upon and claims the benefit of the priority of Japanese patent application No. 2010-214228, filed on Sep. 24, 2010, the disclosure of which is incorporated herein in its entirety by reference thereto.

TECHNICAL FIELD

This invention relates to a method, an apparatus and a program for processing a contrast picture image of a semiconductor element. More particularly, it relates to a method, an apparatus and a program for deciding the contrast of each wiring (interconnect) of a semiconductor element in a contrast image obtained with a scanning electron microscope, referred to below as SEM, or with a focused ion beam (FIB) device.

BACKGROUND

As the semiconductor element becomes higher in integration or performance, it is becoming more difficult to make failure analysis in the semiconductor element. To facilitate such failure analysis of semiconductor elements, if only to a lesser extent, a wide diversity of techniques for analysis of failures of the semiconductor elements has so far been developed. As one of the techniques for failure analysis of semiconductor elements, there is known a technique of discriminating a failure with an electron beam failure analysis device in accordance with a potential contrast method.

In this method, the surface of an electrically conductive layer (wiring, interconnect or vias) of a semiconductor element is exposed by e.g., polishing. The surface of the semiconductor element is then charged to a desired charging potential. The electrically conductive layer exposed is irradiated with an electron beam, and secondary electrons emitted from the semiconductor element are observed with the scanning electron microscope (SEM) to obtain a potential contrast image. In case an open failure or a shortage failure exists below the electrically conductive layer being observed, the potential contrast image obtained yields different contrast as compared to an image that may be obtained with a regular semiconductor element.

However, the method that uses such electron beam failure analysis apparatus to acquire potential contrast images of a failed semiconductor element and a regular semiconductor element by a potential contrast method to compare these two in order to detect non-coincident portions is premised on the presence of the regular semiconductor element. It is not possible to identify a failed site in case none of the semiconductor elements has been manufactured as designed such that there is no regular device or in case a semiconductor element that may be used as comparison reference has not been produced because of operational failures brought about incidentally. For such case, there has been proposed a method of generating a pseudo-regular picture image from design data to compare it to an image of secondary electrons as an object being analyzed.

Patent Document 1, for example, discloses an automatic inspection system for an X-ray mask etc. In the inspection system, an electron beam is irradiated to an electrically conductive substrate, and one out of secondary electrons generated, reflected electrons and transmitted electrons is detected. Picture images obtained from so generated electron signals are compared to one another to automatically locate the failures. There are proposed die-to-die inspection that compares picture images derived from the dies to each other and a die-to-database inspection that compares a picture image derived from the die and a picture image generated by a picture image simulator that has input CAD data of the die (pseudo-regular picture image).

Patent Document 2 discloses detecting and deciding a failure or foreign matter, according to which a semiconductor wafer being inspected is put on a sample stand of an electron microscope and an electron beam is irradiated to an inspection area on the major surface of the semiconductor wafer. The inspection area represents an object of inspection. By so doing, secondary electrons and reflected electrons are generated and detected respectively by a secondary electron detector and by a reflected electron detector. A detection signal converter, a picture image write/display circuit, a comparison calculation circuit and a failure determining processing circuit are then in operation to detect and identify failures or foreign matter.

In the method of Patent Document 1, according to which a pseudo-regular picture image is generated from design data and compared to an image of secondary electrons being analyzed, it is difficult to compare the images of secondary electrons, observed in a device for analysis, such as SEM, with the pseudo-regular picture image. The images of secondary electrons, observed in general in a device for analysis, such as SEM, are difficult to compare to the picture image of the pseudo-regular picture image on account of the difference in shape and scale size from the design data. It may be said that miniaturization of the semiconductor element, now going on at large, may account for such difficulty. With this in view, there are disclosed methods in Patent Documents 3 and 4 for generating a pseudo-regular picture image from an image of secondary electrons of the semiconductor element.

In Patent Document 3, an image of secondary electrons, obtained on irradiating a semiconductor element with a beam of charged particles, is fractionated into a plurality of different potential regions and, using design data, potential concentration distributions of the respective regions are calculated. The respective regions of the image of secondary electrons are colored to different hues in accordance with the potential regions to generate a pseudo-regular secondary electron image. The pseudo-regular secondary electron image and the secondary electron image being analyzed are displayed. In Patent Document 3, the potential contrast image is fractionated into a plurality of different potential regions. Then, using design data, the potential concentration distributions of the respective regions, corresponding to luminosity or contrast in the contrast image, are calculated.

In Patent Document 4, the secondary electron image, obtained on irradiating the semiconductor element with a beam of charged particles, is fractionated into a plurality of different potential regions. The concentrations of the respective regions are smoothed by carrying out smoothing processing to generate a pseudo-regular secondary electron image. The pseudo-regular secondary electron image and the secondary electron image being analyzed are displayed.

FIG. 18 depicts a block diagram of the device for analysis shown in Patent Document 4. A SEM image inputting means 10 inputs secondary electrons from a SEM device. The secondary electrons have been obtained on irradiating the semiconductor element with a beam of charged particles. A potential-based fractionating means 12 fractionates the secondary electron image, input to the SEM image inputting means 10, into a plurality of potential-based regions, using design data of the semiconductor element stored in a design data memory means 16 as reference. The potential concentrations are smoothed by a region-based smoothing means 14 from one potential-based region to another. In more concrete terms, the potential contrast is varied depending on different types of connection destinations of the wiring (interconnects), such as P+ diffusion, N+ diffusion or Poly-Si, as disclosed in paragraph [0014] of Patent Document 4.

Non-Patent Document 1 shows canny edge detection. Though not directly relevant to failure analysis of semiconductor elements, this canny edge detection is a method for object contour detection well-known in the field of computational picture image processing. It is generally accepted that the canny edge detection is featured by low error rates in edge extraction, high edge position detection accuracy and detection of a single edge per edge region.

[Patent Document 1] JP Patent Kokai Publication No. JP-A-5-258703
[Patent Document 2] JP Patent Kokai Publication No. JP-P2006-286685A
[Patent Document 3] JP Patent Kokai Publication No. JP-P2009-231490A
[Patent Document 4] JP Patent Kokai Publication No. JP-P2009-252414A
[Non-Patent Document 1] J. Canny: "A Computational Approach to Edge Detection", IEEE Trans. On Pattern Analysis and Machine Intelligence, 8(6), pp. 679 to 698, November 1986

SUMMARY

The entire disclosures of the aforementioned Patent Documents and Non-Patent Document are incorporated herein by reference thereto. The following analysis is afforded by the present invention.

The method in which the electron beam failure detection device is used to detect a non-coincident location is premised on the presence of a regular semiconductor element. In this method, a potential contrast image of a failed semiconductor element and a potential contrast image of a regular semiconductor element are acquired by the potential contrasting method and compared to each other to detect the non-coincident location. If there is no regular product because none of the semiconductor elements was produced exactly as designed or a semiconductor element that may be used as comparison reference may not be obtained due to the presence of incidental operational defects, it is not possible to locate the failed site.

According to Patent Documents 1, 3 and 4, pseudo-regular images may be produced. However, by luminosity from one interconnect to another may not be discriminated from the potential contrast image as an object for analysis. Even if the potential-based fractionation means or the area smoothing means, shown in Patent Documents 3 and 4, is applied to the potential contrast image being analyzed, boundary regions of the interconnect are obscure in a potential contrast image, such as secondary electron image, in a highly miniaturized semiconductor element. Moreover, in the potential contrast image, luminosity is not constant (see FIG. 3), with a result that different potential-based regions may not be fractionated readily. In addition, luminosity also may not be discriminated readily in consideration that luminosity is varied from one destination of connection of an interconnect to another.

It may be envisaged to use canny edge detection as disclosed in Non-Patent Document 1 as a method for contour detection. However, with the potential contrast image, such as secondary electron image, having an obscure interconnect boundary, the edge detected is noisy and is non-continuous, meaning that a figure obtained is not an ideal one that permits the contour detection. See FIG. 17 where non-continuous portions are indicated by open arrows. It is difficult to detect just the interconnect because even weak edges in the inside of the interconnect are detected, too.

According to the present invention, there is provided a method for processing a contrast picture image of a semiconductor element. The method comprises a color grade number reducing processing, an interconnect contrast extraction processing and a shift processing. The color grade number reducing processing automatically reduces whose number of color grades of the contrast picture image of a semiconductor element obtained from a device for analysis, in keeping with the contrast of the contrast picture image. The interconnect contrast extraction processing classifies pixels contained in the contrast picture image, the number of color grades of which has been reduced, in accordance with a preset contrast threshold value as reference, to extract an interconnect pattern fractionated into a plurality of contrasts. The shift processing removes noise contained in a contour portion of the interconnect pattern by shifting the contour portion. An interconnect pattern contained in the contrast image of the semiconductor element obtained from the device for analysis may thus be fractionated into a plurality of preset contrasts and extracted.

According to the present invention, there is provided a contrast picture image processing device for a semiconductor element. The contrast picture image processing device comprises a color grade number reducing unit, an interconnect contrast extraction unit, a shift unit and a picture image data outputting unit. The color grade number reducing unit receives a contrast image of the semiconductor element obtained from a device for analysis, automatically reduces the number of color grades of the input contrast picture image based on contrast distribution of the input contrast image and outputs a contrast image having a reduced number of color grades. The interconnect contrast extraction unit receives the contrast image having the reduced number of color grades, classifies pixels contained in the contrast picture image, whose number of color grades has been reduced, in accordance with a preset contrast threshold value as reference, to extract an interconnect pattern fractionated into a plurality of contrasts. The shift unit inputs the interconnect pattern image extracted by the interconnect contrast extraction unit and removes noise contained in a contour portion of the interconnect pattern by shifting the contour portion. The picture image data outputting unit outputs an interconnect pattern image freed of noise of the contour portion by the shift unit.

According to the present invention, there is provided a program for processing a contrast picture image of a semiconductor element. The program allows a computer to execute a color grade number reducing processing, an interconnect contrast extraction processing, a shift processing and a picture image data outputting processing. The color grade number reducing processing receives a contrast image of the semiconductor element, obtained from a device for analysis, automatically reduces the number of color grades of the input contrast image based on the contrast distribution thereof, and outputs a contrast image whose number of color grades has been reduced. The interconnect contrast extraction processing receives a contrast image, whose number of color grades has been reduced, classifies pixels contained in the contrast image, whose number of color grades has been reduced, in accordance with a preset contrast threshold value, and extracts an interconnect pattern image fractionated into a plurality of contrasts. The shift processing receives the interconnect pattern image extracted by the interconnect contrast extraction processing and removes noise of a contour portion of the interconnect included in the interconnect pattern image by shifting the contour portion. The picture image data outputting processing outputs an interconnect pattern image, freed of the noise in the contour portion by the shift processing, as picture image data.

The meritorious effects of the present invention are summarized as follows, but without limitation.

According to the present invention, interconnects (wirings) on a semiconductor element and the contrasts thereof may readily exactly be verified and extracted by picture image processing of the contrast image of the semiconductor element obtained from a device for analysis. Thus, picture image comparison of a regular picture image or a pseudo-regular picture image to a failed picture image in locating a failed site in a contrast image of the failed semiconductor element may be carried out exactly readily.

PREFERRED MODES

Preferred exemplary embodiments of the present disclosure will be described in detail with reference to the drawings. It is noted that, in the explanation of the present disclosure, an interconnect (wiring) or an interconnect (wiring) pattern broadly denotes a conductor pattern of a semiconductor element which, if the semiconductor element is analyzed by a device for analysis, will yield a contrast image. Viz., the interconnect pattern means not only a metal interconnection but also a conductor pattern of contacts, vias, electrodes and so forth.

Exemplary Embodiment 1

Exemplary Embodiment of a Method for Processing a Contrast Picture Image of a Semiconductor Element (Schemata of the Exemplary Embodiment 1)

Figure 1:
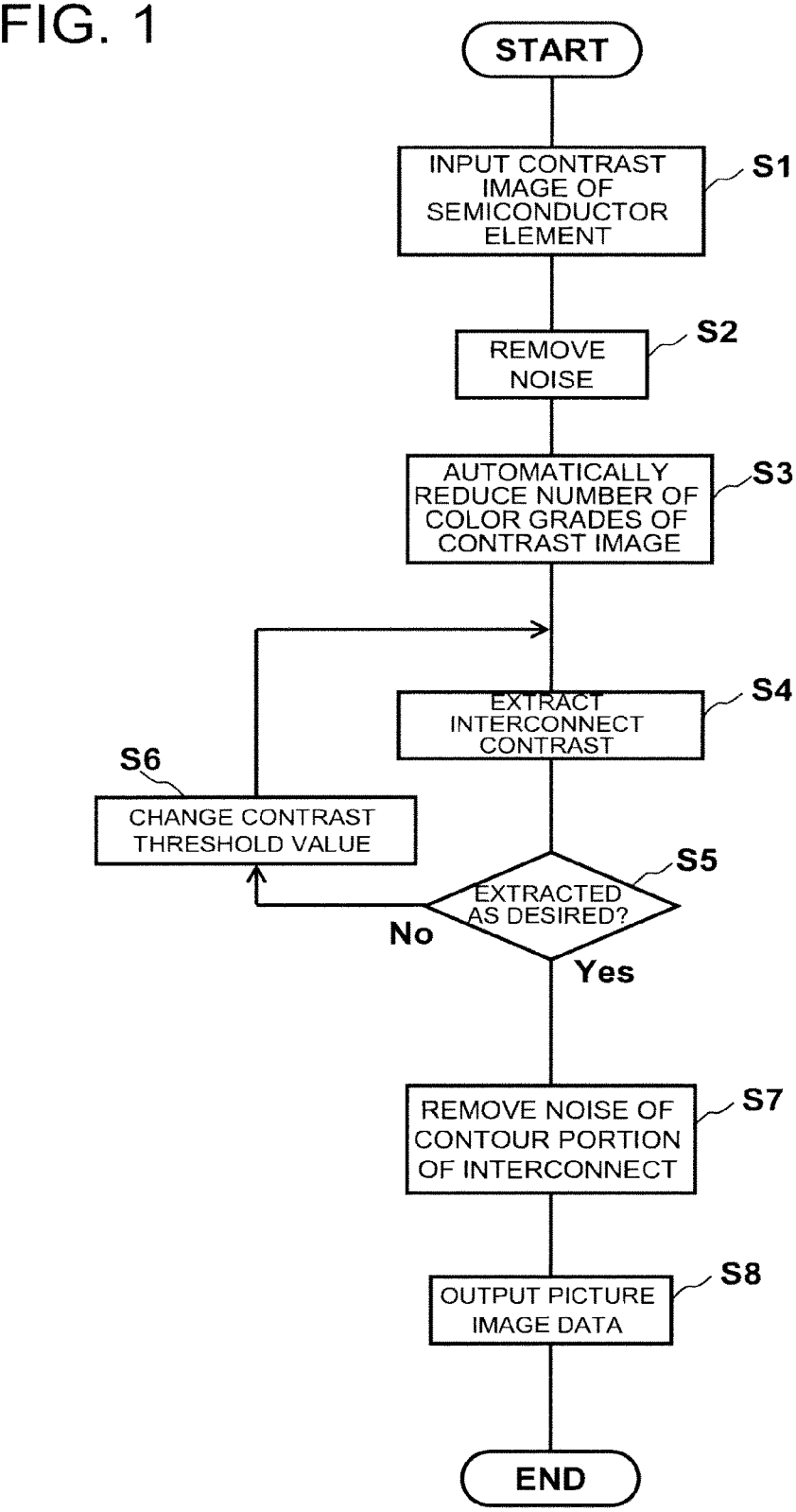
FIG. 1 is flowchart showing schemata of a method for processing a contrast picture image of a semiconductor element according to an exemplary embodiment 1 of the present disclosure.
Figure 2:
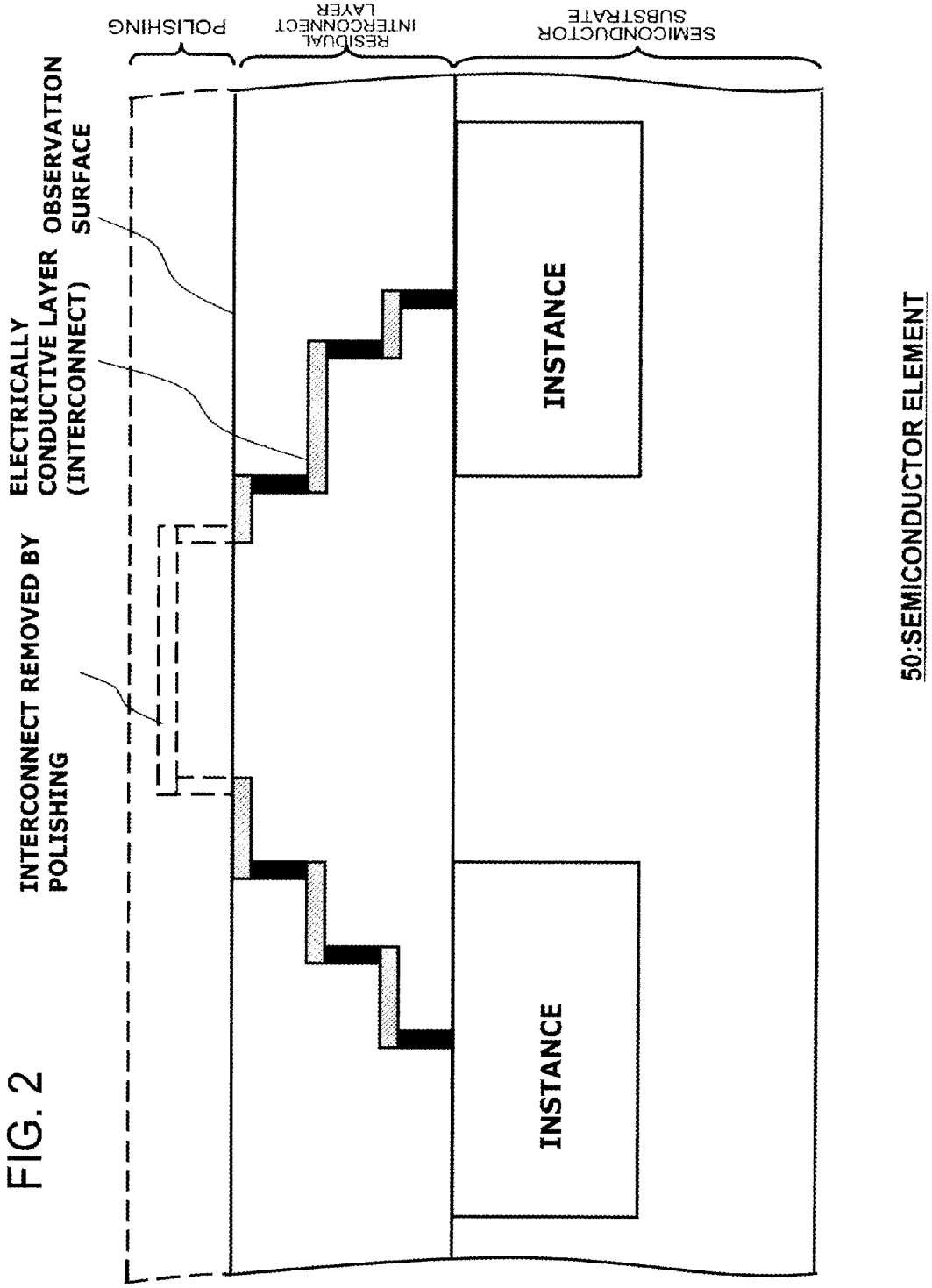
FIG. 2 is a cross-sectional view showing an example structure of a semiconductor element as an object of failure analysis.
Figure 3:
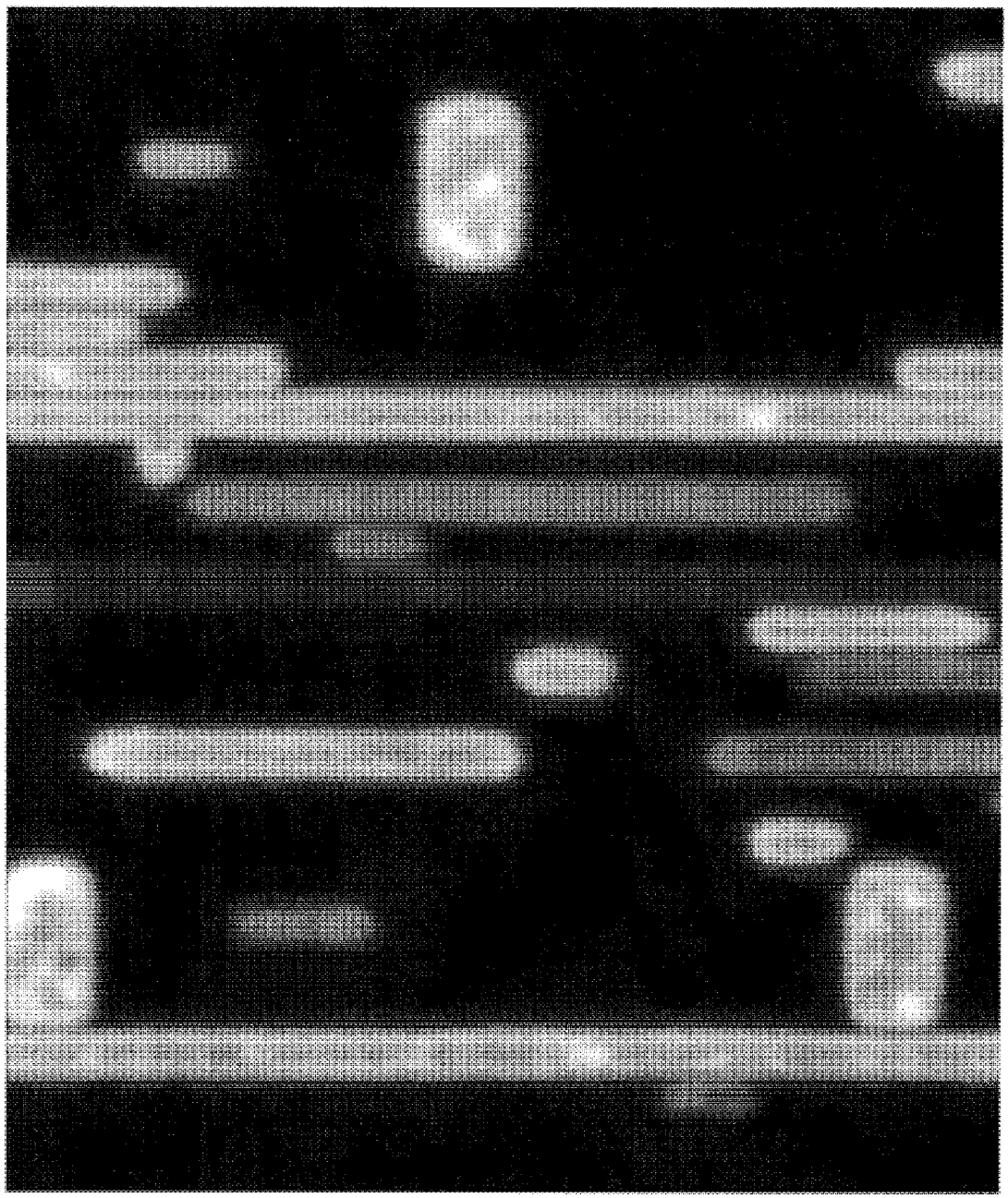
FIG. 3 shows an example contrast image of a semiconductor element obtained from a device for analysis.

FIG. 1 is a flowchart showing schemata of a method for processing a contrast picture image of a semiconductor element according to the exemplary embodiment 1. Initially, the outline of the exemplary embodiment 1 will be explained in accordance with a flowchart of FIG. 1. In step S1, a surface of a semiconductor element 50 is polished to expose the surface of an electrically conductive layer (interconnect) of a semiconductor element 50, as an object for analysis, as shown in FIG. 2. The surface of the semiconductor element 50 is then charged to a desired charging potential. An electron beam is irradiated on the so exposed electrically conductive layer. Secondary electrons emitted from the semiconductor element are observed with a scanning electron microscope (SEM) and a potential contrast image obtained is input to a device for analysis. FIG. 3 shows an example potential contrast image obtained with a device for analysis.

Figure 4:
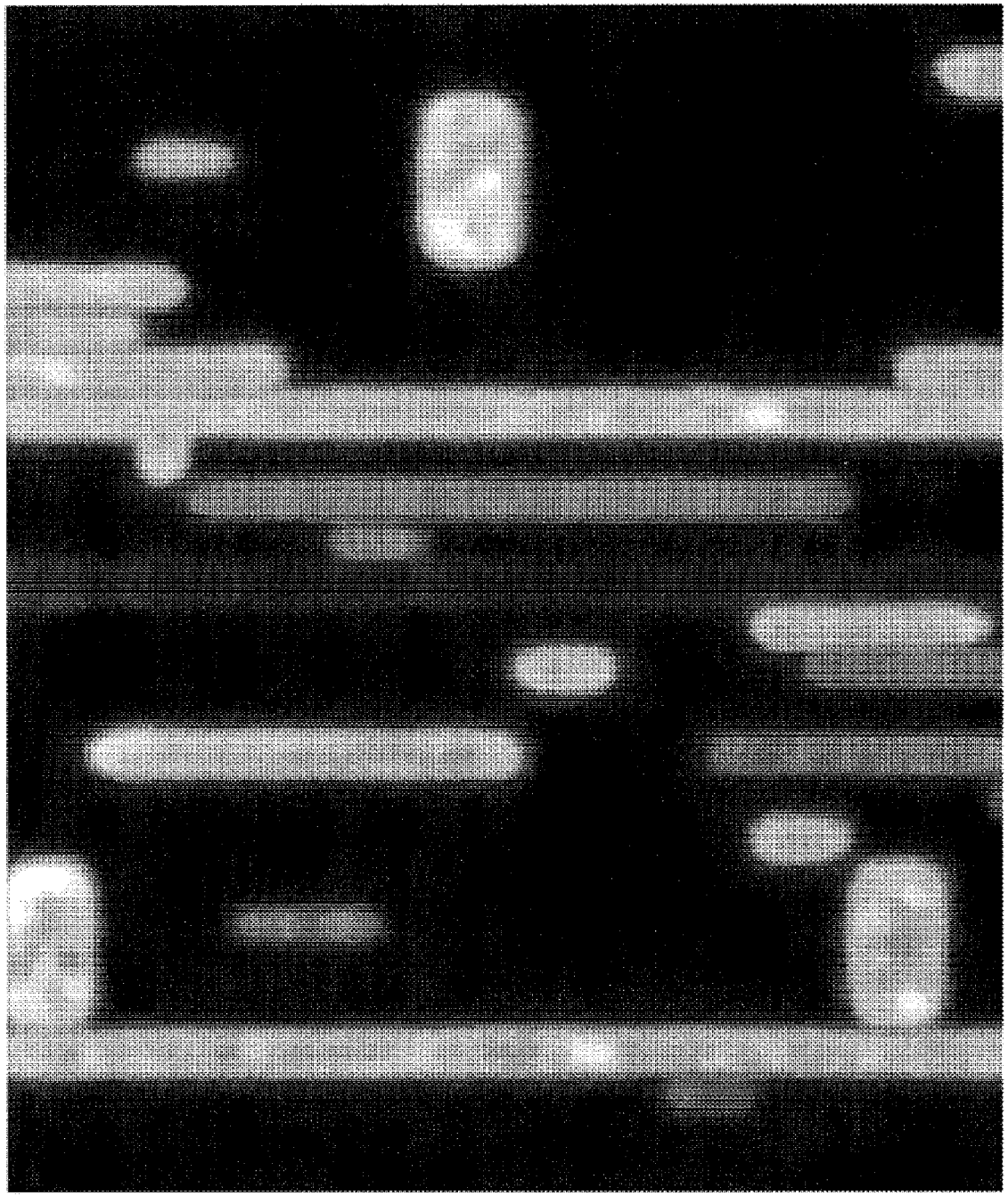
FIG. 4 shows a contrast image following the processing (step S2 of FIG. 1) of noise removal of the contrast image shown in FIG. 3.

In step S2 of FIG. 1, the processing for removing, in advance, any noise contained in a potential contrast image obtained from the device for analysis, is carried out. FIG. 4 shows a noise-free contrast image obtained on carrying out a processing for removing the noise from the potential contrast image of FIG. 3. In case no outstanding noise may be noticed in the potential contrast image, this noise removing processing may be dispensed with. However, if the potential contrast image is noisy, it is desirable to carry out the noise removing processing at this stage.

Figure 5:
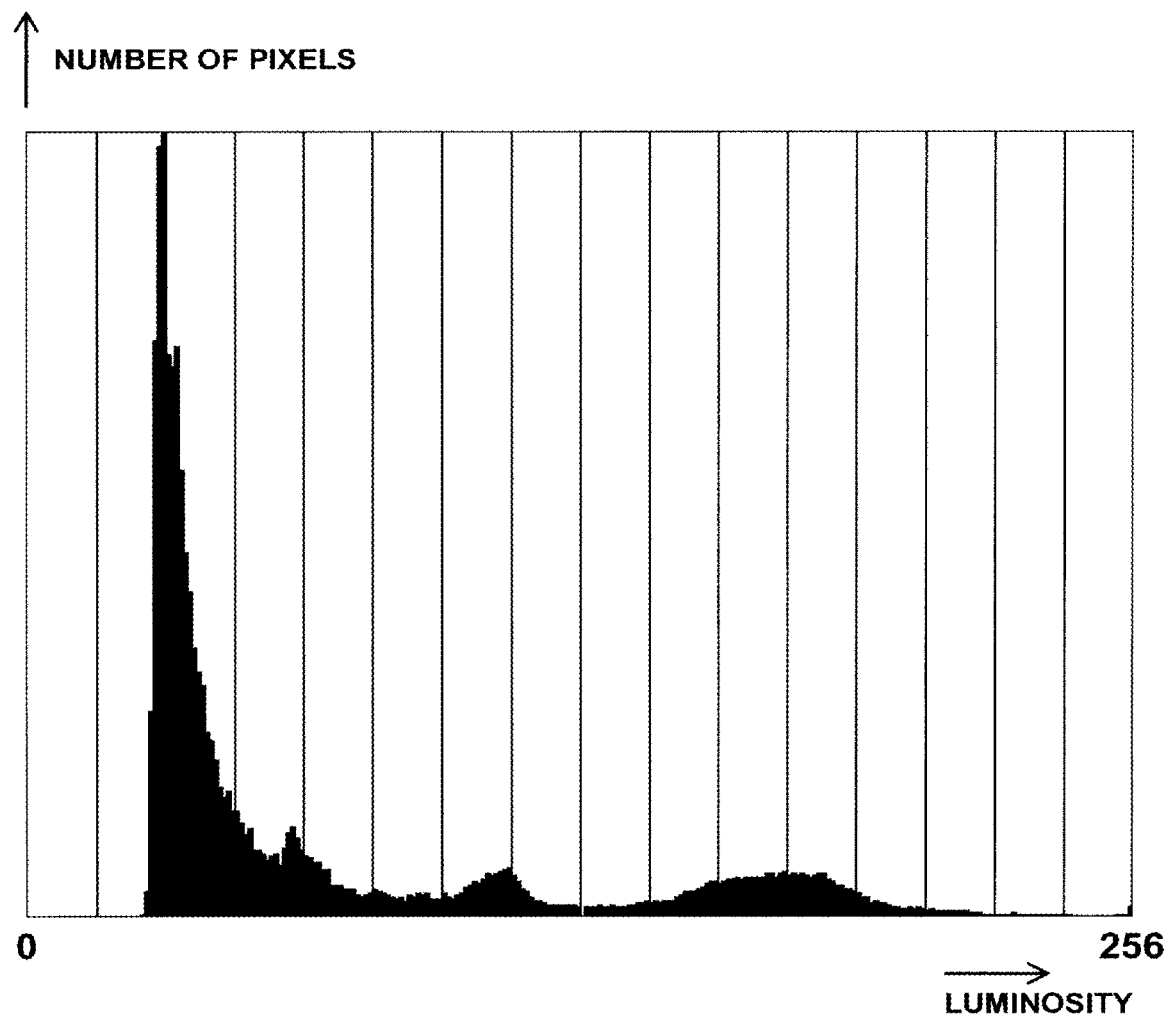
FIG. 5 is a luminosity histogram of a contrast image before the processing of color grade number reduction (step S3 of FIG. 1).
Figure 6:
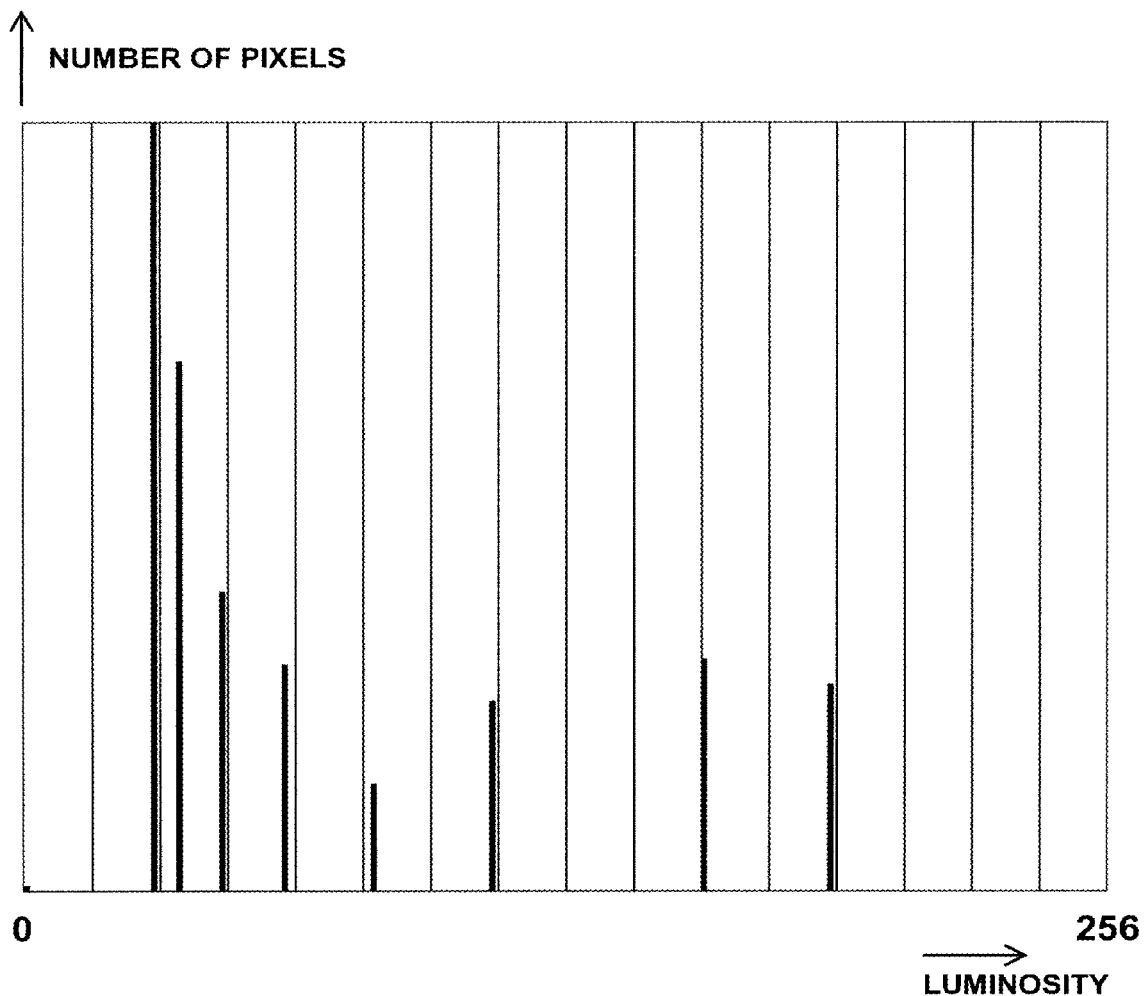
FIG. 6 is a luminosity histogram of a contrast image after the processing of color grade number reduction (step S3 of FIG. 1).

Next, in step S3, the processing of reducing the number of color grades in luminosity, which means a processing of reducing the number of grades (levels) of luminosity of the contrast image, is carried out. For example, a contrast image with 256 grades of luminosity shown in FIG. 4 is turned into a contrast image with say four to 16 grades of luminosity shown in FIG. 7. The reason of reducing the number of color grades in luminosity at this stage is to provide for facilitated contrast-based extraction of the interconnect pattern in step of interconnect contrast extraction (step S4) next following the processing of reducing the number of color grades in luminosity (step S3). FIG. 5 shows a luminosity histogram before the color grade number reducing processing and FIG. 6 shows a luminosity histogram after the color grade number reducing processing.

Figure 8:
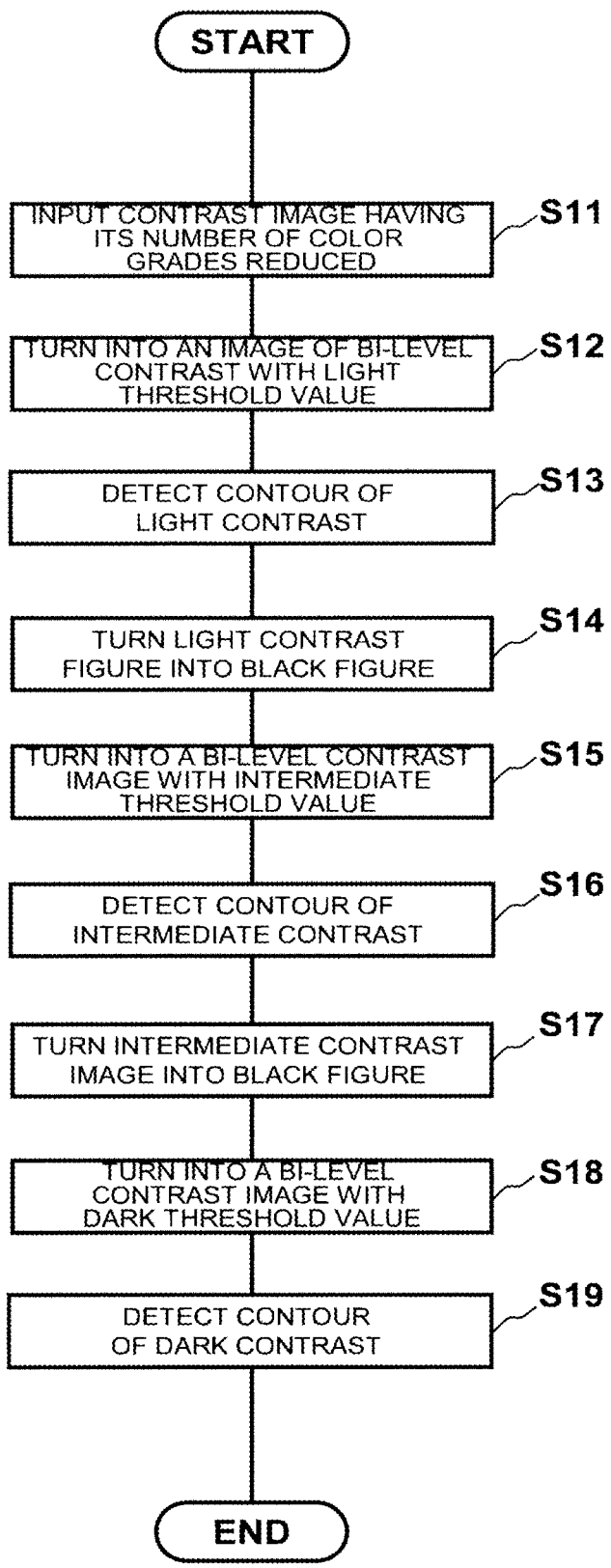
FIG. 8 is a detailed typical flowchart for illustrating the processing for extraction of the contrast interconnect (step S4) in FIG. 1.
Figure 9:
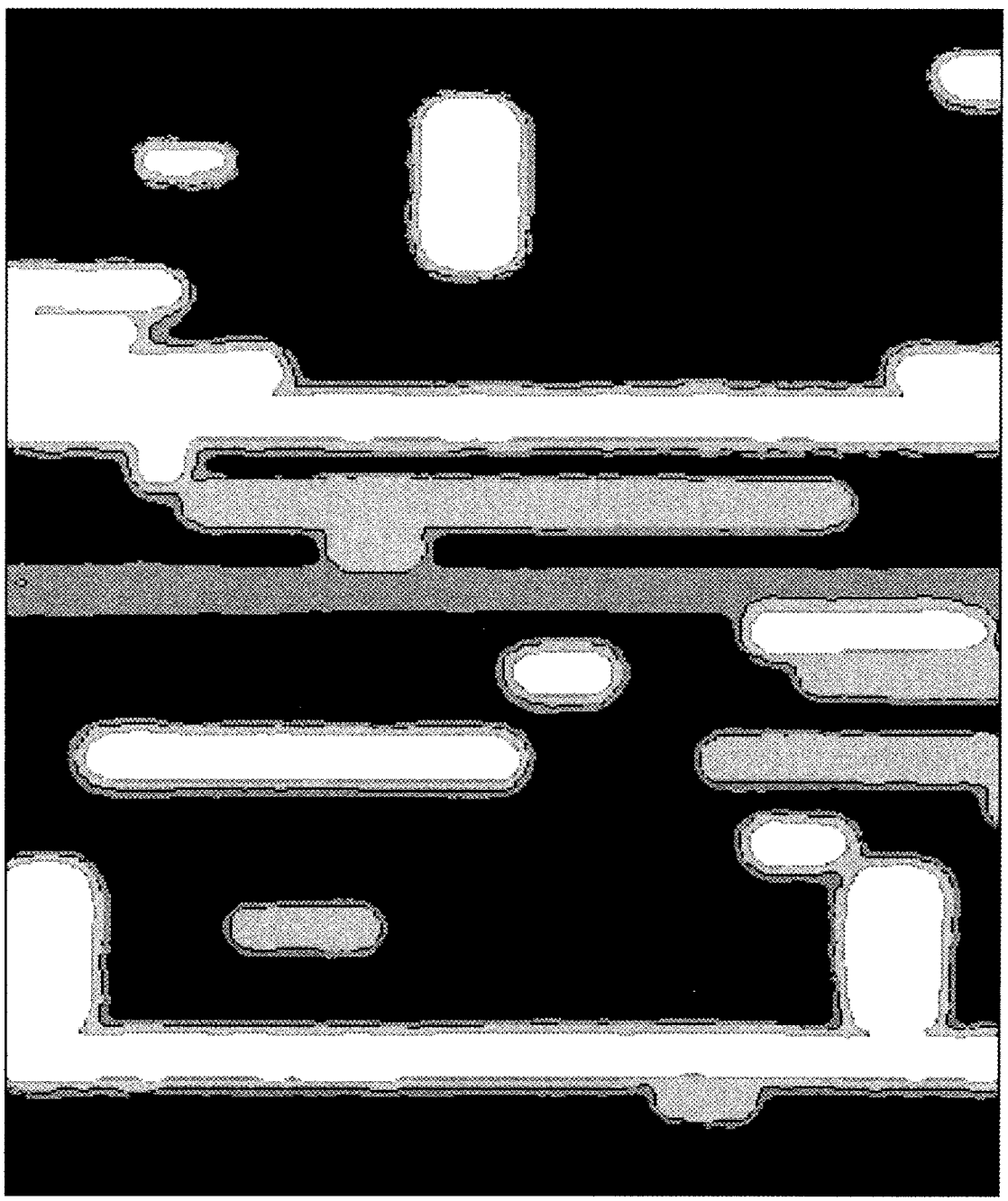
FIG. 9 shows a contrast image following the processing on the contrast image of FIG. 7 for extraction of the interconnect contrast (step S4) in FIG. 1.
Figure 10:
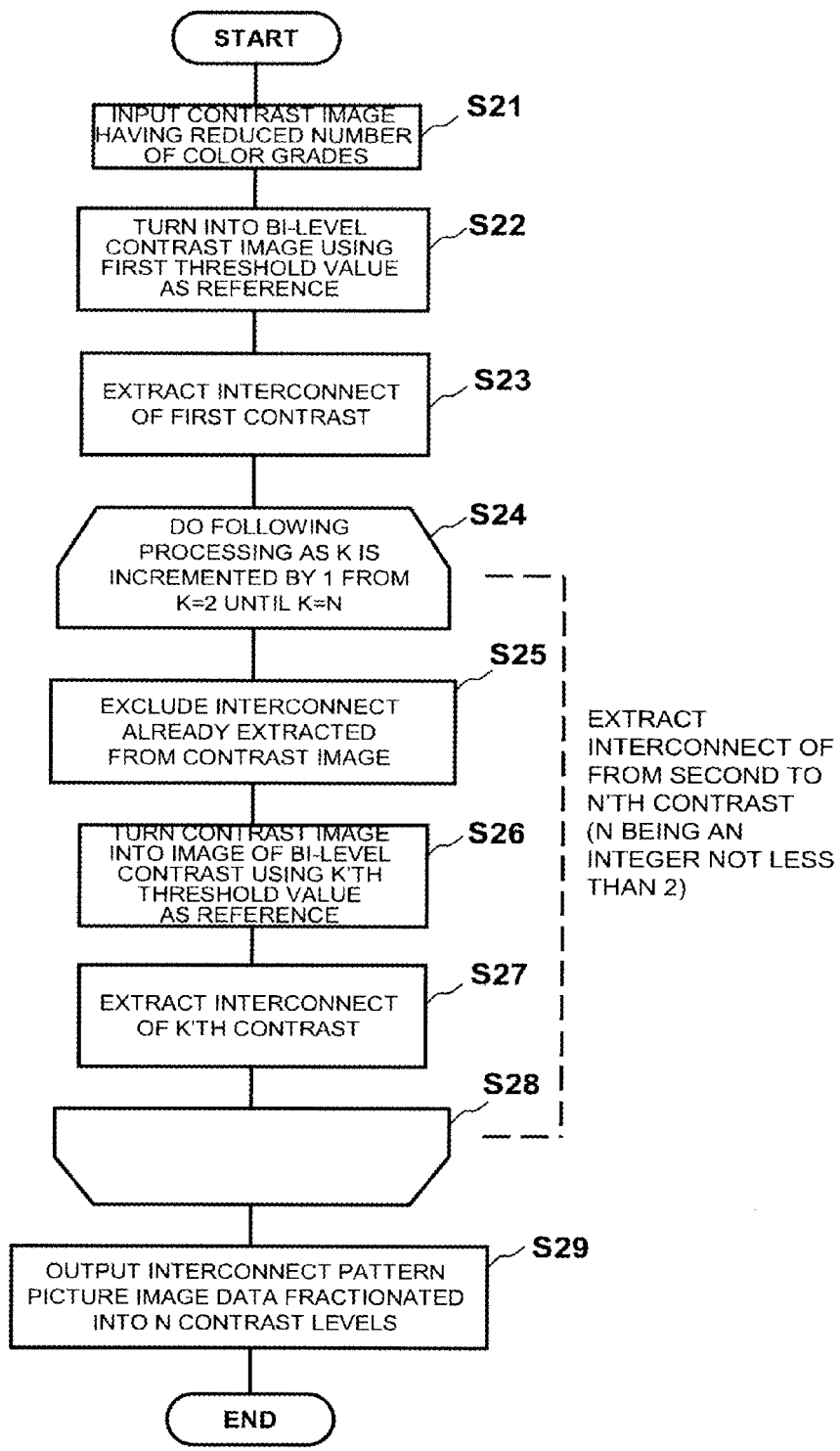
FIG. 10 is a more general detailed typical flowchart for illustrating the processing for extraction of the interconnect contrast (step S4) in FIG. 1.

In step S4, the contrast image is turned into an image of bi-level contrast or luminosity, using a preset contrast threshold value as a reference, and the so produced image of bi-level contrast or luminosity is extracted. In case a desired interconnect pattern has not been extracted, the contrast threshold value may be changed and the above mentioned processing may be repeated with a new contrast threshold value(s) until a desired interconnect pattern is extracted (steps S5 and S6). FIG. 9 shows an illustrative contrast image in which three grades (levels) of luminosity, viz., light, intermediate and dark, have been extracted in the contrast image of FIG. 7 by the interconnect contrast extraction processing shown in FIG. 8. FIG. 10 shows the processing of extracting N grades (levels) of contrast of the interconnect pattern, where N denotes an integer not less than 2.

In the color grade number reducing processing of step S3, the number of grades of luminosity of the contrast image is reduced, so that, in the processing of extracting the interconnect contrast of step S4, the number of threshold values to be selected and set may be smaller. Hence, it becomes easier to set the threshold value for deciding the contrast (luminosity). In case the figure extraction is repeated as the contrast image is turned into an image of bi-level contrast or luminosity, an interconnect (wiring) may be recognized without detecting fine edges.

Figure 11:
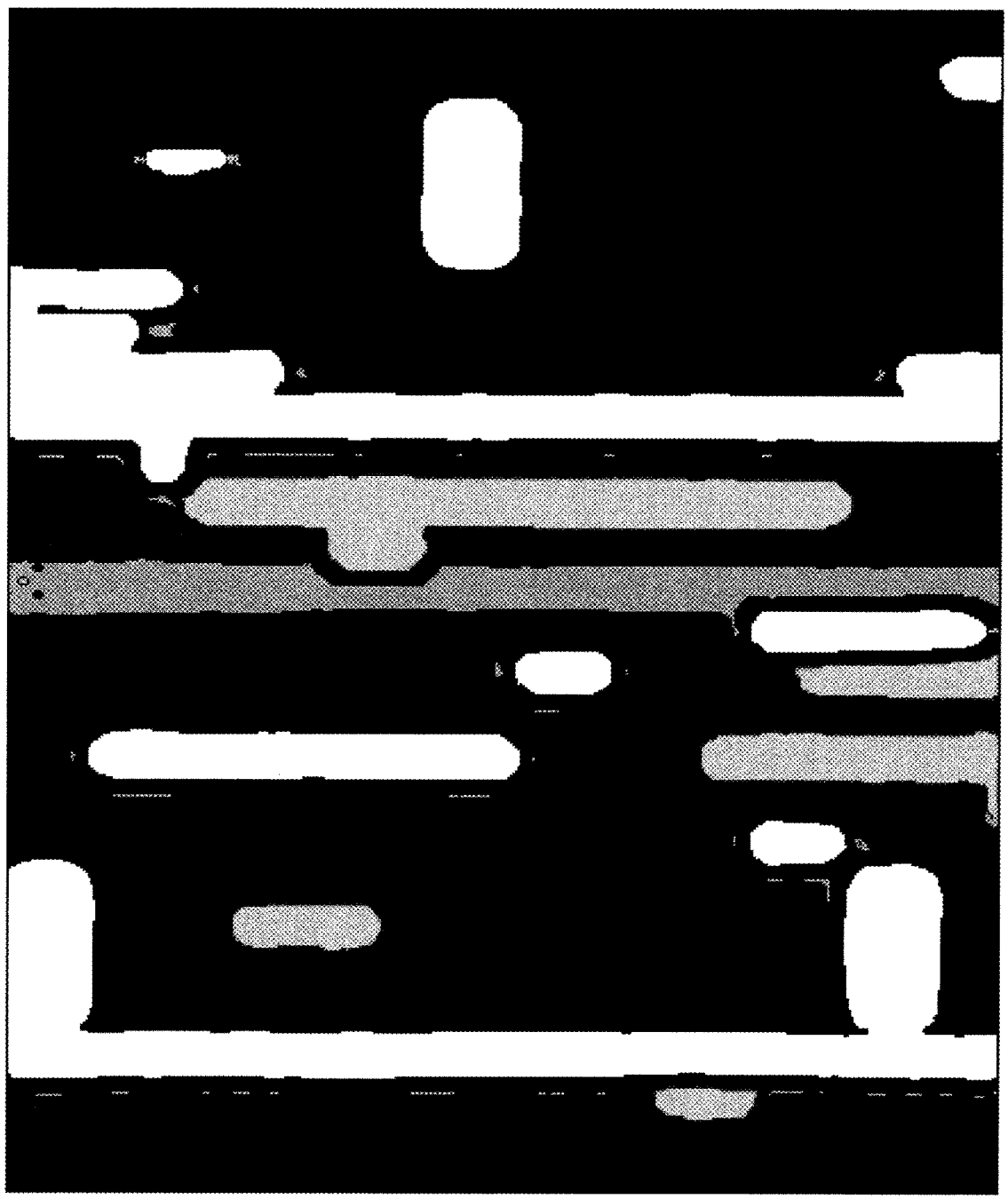
FIG. 11 shows a contrast image following a shift processing (step S7 of FIG. 1) on the contrast image shown in FIG. 9.

In step S7, the contour part of an interconnect is freed of noise by shifting in a direction of reducing or thickening an outer rim of the interconnect pattern extracted in step S4, by way of performing shift processing. In this shift processing, the contour of the interconnect, obtained by the interconnect contrast extraction processing of step S4, is shifted by several pixels, thereby removing the noise ascribable to luminosity difference (contrast) at the interconnect boundary region. FIG. 11 shows a shift-processed interconnect pattern image (contrast image). This shift processing leads to improved viewability of the interconnect pattern.

In step S8, the contrast image, obtained by the processing of steps S1 to S7, is output. It is also possible to output contrast images, processing parameters and contour coordinates as well as luminosity of respective interconnects, obtained in the course of the processing of steps S1 to S7, for storage as data or for display on a picture image surface.

It is noted that, in the field of failure analysis of a semiconductor element, the contrast of the contrast image of the semiconductor element, processed in steps S1 to S8, is usually expressed in terms of luminosity. It is thus assumed in the description to follow that reduction in the number of color grades (step S3) and extraction of interconnect contrasts (step S4), are carried out with the use of luminosity (or luminance) as reference. It is however also possible to fractionate the contrast image in terms of other color attributes, such as color hues, in place of fractionating it in terms of luminosity.

(Step S1: Details of Inputting of a Contrast Image of a Semiconductor Element)

The processing of FIG. 1 will now be explained step-by-step. Initially, the processing of inputting a contrast image of the semiconductor element of step S1 will be explained. FIG. 2 is a transverse cross-sectional view showing an example structure of a semiconductor element as an object of failure analysis. An interconnect layer is formed on a surface of a semiconductor substrate of a semiconductor element 50. Part of the interconnect layer is removed on polishing to expose the electrically conductive layer (interconnect) on a surface of the semiconductor substrate. The interconnect (wiring conductor) not removed on polishing is connected to a functional circuit which is termed an instance (or a cell or a transistor) formed on the surface of the semiconductor substrate.

If an observation surface is observed from the surface of the semiconductor element 50, part of the interconnect of FIG. 2 (electrically conductive layer) is exposed. It is noted that the interconnect, disposed in a layer above the observation surface (the interconnect indicated by a broken line in FIG. 2) has been removed by polishing. In this state, the semiconductor element 50 is charged to a desired charging voltage, and irradiated with charged particles.

For example, suppose that a SEM (Scanning Electron Microscope) is used. As a semiconductor element has been charged to a preset charging potential, electron rays are caused to be incident on the semiconductor element, and secondary electrons emitted from the semiconductor element are detected to observe the surface of the semiconductor element, viz., the observation surface. An image may then be obtained in which the contrast differs with the potential on the surface of the semiconductor element.

The charged state of the electrically conductive layer on the observation surface differs with the sort of a terminal point (instance) connecting to the electrically conductive layer and with electrons being or not being supplied. As a result, different contrast may be obtained in the electrically conductive layer on the observation surface. In SEMs or FIBs of high resolution, three or more levels of potential contrasts appear depending on the destinations of connection of the interconnects, such as P+ diffusion layer, N+ diffusion layer or Poly-Si, as shown for example in FIG. 3.

There are two charging conditions for the semiconductor element, viz., a positive charging (Positive Voltage Contrasting, abbreviated to PVC) and a negative charging (Negative Voltage Contrasting, abbreviated to NVC) of the observation surface. In case the observation surface is charged to a positive polarity under the PVC condition, and the terminal point (instance) of the interconnect is the P+ diffusion layer of the PMOS transistor, electron movement from a silicon substrate is forwardly biased. Hence, electrons are supplied to retard charging, thus resulting in light contrast. In case of non-electrical conductivity due to high resistance failures, electrons are supplied in lesser quantities to promote charging, thus leading to dark contrast.

In case the terminal point of the interconnect is the N+ diffusion layer, the P-type silicon substrate and the N+ diffusion layer are reverse-biased with respect to the positive charges on the observation surface. It is thus hard for the carriers to be moved, so that the charging may proceed more conspicuously than in the case of the P+ diffusion layer, thus providing dark contrast. Moreover, in case the terminal point of the interconnect is a gate electrode, charging may proceed more strongly than with N-diffusion. Hence, the contrast is darker than in the ease of N-diffusion.

FIG. 3 shows a potential contrast image of a semiconductor element obtained as described above. The potential contrast image obtained with the device for analysis shown in FIG. 3 has 256 grades (levels) of luminosity.

(Step S2: Details of Processing for Noise Removal)

In step S2 of FIG. 1, the processing of removing the noise contained in the potential contrast image (FIG. 3) is carried out. In the field of failure analysis of the semiconductor element, the processing of noise removal has so far not routinely been practiced. However, in the present exemplary embodiment, the processing of noise removal is carried out at this stage in case the original contrast image is noisy. As for an algorithm of removing the noise from the potential contrast image, it is possible to use algorithms of noise removal used in other fields of picture image processing. A few methods effective as processing for removing the noise from the potential contrast image of a semiconductor element will now be explained.

As the processing of removing the noise from the potential contrast image of a semiconductor element, the processing with a bilateral filter may be used. In the processing with the bilateral filter, smoothing may be realized in the contrast image as the contour is kept by changing the weight depending on the pixel-to-pixel distance and by reducing the weight at a location of a marked change in luminosity. It may be effective to repeat the processing bilateral filtering a plurality of numbers of times.

By repeating the processing of bilateral filtering a plurality of numbers of times, pixels of proximate pixel values are collected together so as to have the same pixel value. Thus, if a contrast image has an obscure interconnect boundary and non-constant luminosity, it is possible to smooth luminosity and to remove the noise as the contour, viz., the interconnect boundary, is maintained.

As the processing of removing the noise from the potential contrast image of a semiconductor element, a median filter may also be used. In this median filter, a pixel of interest and a plurality of neighbor pixels are arrayed in the order of increasing/decreasing luminosity to find a median luminosity value, and the luminosity value of the pixel of interest is replaced by the median value. This operation is performed for the respective pixels of the contrast image. The median filter may be used for a contrast image with an obscure interconnect boundary and non-constant luminosity in order to remove pixels with extremized luminosity while the contour is maintained. The median filter may be used effectively to remove the noise of a miniscule size, such as spiked noise or pepper-particle-sized noise.

As the processing for removing the noise from the potential contrast image of the semiconductor element, a contraction/expansion processing may be used. In this contraction/expansion processing, from luminosity values of a pixel of interest and a plurality of neighbor pixels, a minimum luminosity value is found. The luminosity values of the pixel of interest and the neighbor pixels are replaced by the minimum luminosity value by way of performing contraction processing. Then, from luminosity values of the pixel of interest and a plurality of neighbor pixels, a maximum luminosity value is found. The luminosity values of the pixel of interest and the neighbor pixels are replaced by the maximum luminosity value by way of performing expansion processing. This operation is performed for the respective pixels of the contrast image.

With the contraction/expansion processing, it is possible to remove the noise such as small-sized dust and dirt or crack from a contrast image suffering obscure interconnect boundaries or non-constant luminosity.

The processing of noise removal may also be carried out in combination with the processing with the bilateral filter, that by the median filter and that by the contraction/expansion processing. The noise filtering processing may be carried out a number of times as needed in order to remove the noise. FIG. 4 shows a contrast image obtained after subjecting the potential contrast image of FIG. 3 to the contraction/expansion processing twice and to the bilateral filtering processing five times.

(Step S3: Details of Processing for Reducing the Number of Color Grades)

The processing of reducing the number of color grades of step S3 is then carried out. In the processing for reducing the number of color grades, the number of color grades, viz., contrast grades, is reduced beforehand to enable an operator to set contrast threshold values with ease in the next following processing of step S4 of extracting the interconnect contrast. In this processing of reducing the number of color grades, it is necessary to set the number of color grades obtained following the color grade number reduction. It is however unnecessary to set the contrast threshold value. Such an algorithm is to be used in which the colors, viz., the contrast grades, following the reduction of colors, the number of which is in keeping with the preset number of color grades, will automatically be matched to the contrast of the pixels contained in the image. For example, luminosity (contrast) of the respective pixels of the contrast image may automatically be classified by a data clustering method without using an exterior criterion (threshold value setting), whereby the colors (the grades of luminosity) of the contrast image following the color grade number reduction may be matched to the contrast image that prevailed before the color grade number reduction (before reduction of the grades of luminosity).

For example, as the processing for reducing the number of color grades, the number of color grades following the reduction of the number of color grades (number of clusters) is given at the outset. A reference value is given each cluster at random. Then, luminosity of each pixel of the contrast image is allocated to the nearest reference value. An average value of luminosity of the pixels allocated to each cluster is calculated and the average value so calculated is used as a new reference value. The luminosity values of the pixels of the contrast image are automatically classified by repeating the calculation of the reference values and the allocation of the pixels until convergence is obtained.

Figure 7:
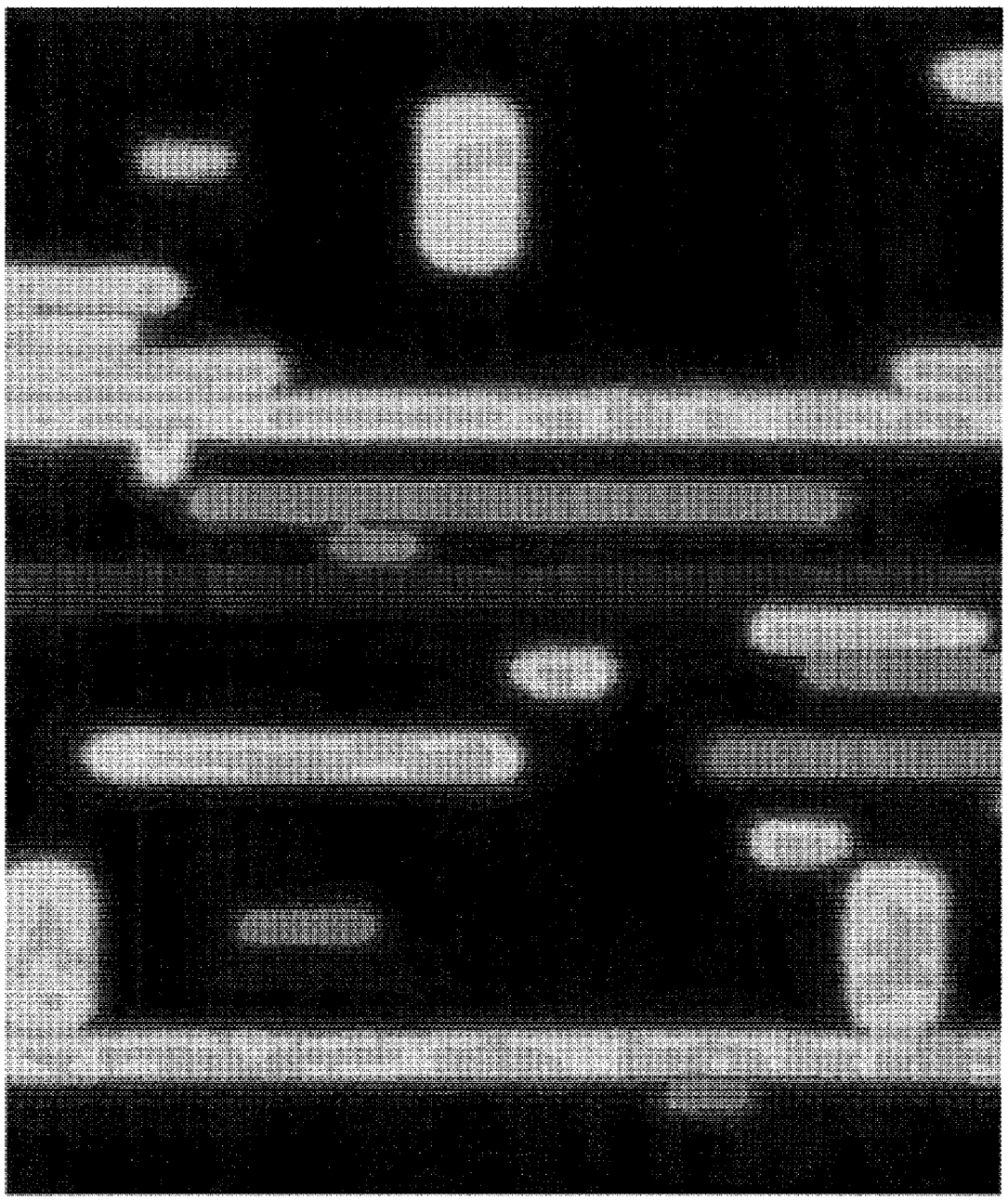
FIG. 7 shows a contrast image after the processing of color grade number reduction (step S3 of FIG. 1) of the contrast image shown in FIG. 4.

By applying the processing of reducing the number of color grades (grades of luminosity) to a contrast image of 256 grades of luminosity, having a histogram shown in FIG. 5, it is possible to automatically reduce the number of color grades (grades of luminosity) of the contrast image to yield a contrast image with eight grades of luminosity having a histogram shown in FIG. 6. The eight grades of luminosity may automatically be set. The contrast image, the number of color grades (grades of luminosity) of which has been reduced to eight (eight grades of luminosity) from the 256 colors (256 grades of luminosity) that prevailed before reducing the number of color grades (grades of luminosity), shown in FIG. 4, is shown in FIG. 7.

Depending on the state of the observation surface of the semiconductor element such as its planarity or crystallinity, or on changes in the conditions under which the semiconductor element is observed with a device for analysis, luminosity or contrast of the contrast image in its entirety is changed each time the analysis is conducted. Even in case the luminosity or the contrast of the entire contrast image may not be viewed with ease by an operator, the number of grades of luminosity may be reduced easily exactly by conducting simple automatic classification of the luminosity values of the pixels without exterior criterion and by specifying the number of grades of luminosity after color grade number reduction.

(Step S4: Details of Processing of Extracting Interconnect Contrast)

The processing of extracting the interconnect contrast of step S4 will now be described. The results of investigations by the present inventor have revealed that, with the SEM or the FIB of high resolution, three levels of potential contrast are presented depending on the destination of connection of the interconnects, such as P+ diffusion layer, N+ diffusion layer or the Poly-Si. In such case, failure analysis may be made with success in many cases when the luminosity of the interconnect is fractionated in three levels. Thus, in the interconnect contrast extraction processing of the present exemplary embodiment, three threshold values of light, intermediate and dark may be accorded in order to extract the interconnect pattern. In this case, the interconnect pattern of three contrasts of light, intermediate and dark may be extracted in accordance with the flowchart shown in FIG. 8.

The interconnect contrast extraction processing will now be explained with reference to the flowchart of FIG. 8. It is assumed that the three contrast threshold values of light, intermediate and dark are set in advance. Initially, in step S11, a contrast image, the number of color grades (number of grades of luminosity) of which has been reduced by the color grade number reducing processing, is entered. In the next step S12, the image is turned into an image of bi-level contrast or luminosity, using a light threshold value. At the next step S13, a contour of a figure (a figure delimited by a contour) with a high luminosity value is extracted to extract a light contrast figure. By this step S13, an interconnect pattern with the highest value of luminosity is extracted. Then, in step S14, the light contrast figure, already extracted, has its color converted to black color. The reason of turning the light contrast figure into the figure of black color is to extract an intermediate contrast figure to the exclusion of the light contrast figure already extracted.

In step S15, the image is turned into an image of bi-level contrast or luminosity, using an intermediate threshold value. In step S16, a contour of a figure with a high value of luminosity is extracted in the image of the bi-level contrast or luminosity to extract an intermediate contrast figure. Then, in step S17, the figure of light contrast and the figure of the intermediate contrast are converted to black color figures. The reason of doing so is to extract a figure of dark contrast to the exclusion of the light contrast figure and the intermediate contrast figure already extracted.

In step S18, the image is turned into an image of bi-level contrast or luminosity, using a dark threshold value. In step S19, a contour of a figure with a high value of luminosity is extracted in the image of the bi-level contrast or luminosity obtained with the dark threshold value to extract a dark contrast figure. The figures of three levels of contrast, viz., the light/intermediate/dark contrast, represent interconnects of three levels of contrast, viz., the light/intermediate/dark contrast, respectively.

By setting three threshold values of light/intermediate/dark to the contrast image, the number of color grades (the number of grades of luminosity) of which has been reduced, the interconnects of the three levels of contrast, viz., the light/intermediate/dark contrast, may be extracted with ease. If the contrast image, the number of color grades of which has been reduced, as shown in FIG. 7, is subjected to processing of the flowchart of FIG. 8, it is possible to extract an interconnect pattern, fractionated into three levels of contrast, as shown in FIG. 9.

The finding obtained by the present inventor indicates that fractionation of the potential contrast image of the semiconductor element into three contrast levels to extract interconnect patterns may yield good results. However, contrast extraction in the interconnect contrast extraction may be applied to a case where the contrast image is fractionated into a number of levels of contrast other than three levels. The contrast extraction may also be applied to a contrast image in which light/dark relationship is reversed or in which the contrast is expressed using color hues.

FIG. 10 depicts a flowchart showing the processing of a commonplace interconnect contrast extraction in case of fractionating an interconnect pattern into an N-number of contrast levels. The processing flow is basically the same as that of extracting the interconnect pattern of the three levels of contrast of light/intermediate/dark shown in FIG. 8. Initially, before starting the processing, the threshold values of the N-levels of contrast are set. The value of N of the N-levels is an integer not less than 2 and smaller than the reduced number of color grades (the number of grades of luminosity). In step S21, a contrast image, subjected to the processing of reducing the number of color grades (the number of grades of luminosity), is input. This processing is the processing of step S3 of FIG. 1. In step S22, the contrast image is turned into an image of bi-level contrast or luminosity, using, as reference, the most extreme first one of the N-levels of the threshold values. In step S23, the interconnect pattern of the most extreme contrast is extracted as the interconnect of the first contrast. In steps S24 to S28, the above mentioned steps of processing are repeated from K=2 to K=N as the value of K is incremented by one each time to extract an interconnect pattern of the second to N'th contrast. In step S25, the interconnect pattern of the contrast already extracted is excluded in the contrast image. In step S26, the contrast image is turned into an image of the bi-level contrast or luminosity, using the K'th threshold value as reference. In step S27, an interconnect pattern of the K'th contrast is extracted. The processing from step S25 to step S27 is repeated until K=N, whereby interconnect patterns, fractionated into N levels of contrast, may be extracted. In step S29, interconnect pattern picture image data, fractionated into N levels of contrast, are output.

The contrast image in its entirety is varied in luminosity or contrast, each time the contrast image is analyzed, depending on the state of the observation surface of the semiconductor element, such as planarity or crystallinity, or on changes in the conditions under which the observation is carried out by the device for analysis. However, with the above mentioned processing, the same results of picture image processing may be obtained, even though the overall luminosity or contrast is varied from one contrast image to another, given that the threshold value for the processing of extracting the interconnect contrast is properly set. It is because the number of color grades is reduced without exterior criterion and also because turning a contrast image into an image of bi-level contrast and luminosity and conversion into black color are repeatedly carried out in order to verify the interconnect and its luminosity.

(Step S7: Details of Shift Processing)

The contour of an interconnect in which the contrasts of respective interconnects have been extracted by the interconnect contrast extraction processing (FIG. 9), is shifted by several pixels to remove the noise ascribable to the difference in luminosity at the interconnect boundary. This shift processing removes the noise produced at a contour part of the interconnect pattern. FIG. 11 shows a picture image as being the result of the shift processing. If the shifted picture image is output on a picture image surface for display, an operator is able to comprehend luminosity of the interconnect with much ease.

For example, each contrast pattern is shifted in a direction to contract its outer size. The processing up to this point removes the noise present in a contour part of the interconnect pattern. The interconnect pattern, the outer size of which has been reduced, is shifted, as necessary, in a direction of expanding its outer size, thereby restoring its original outer shape. The processing in its entirety erases the noise present in the contour part.

Comparative Example

Canny Edge Detection

Figure 17:
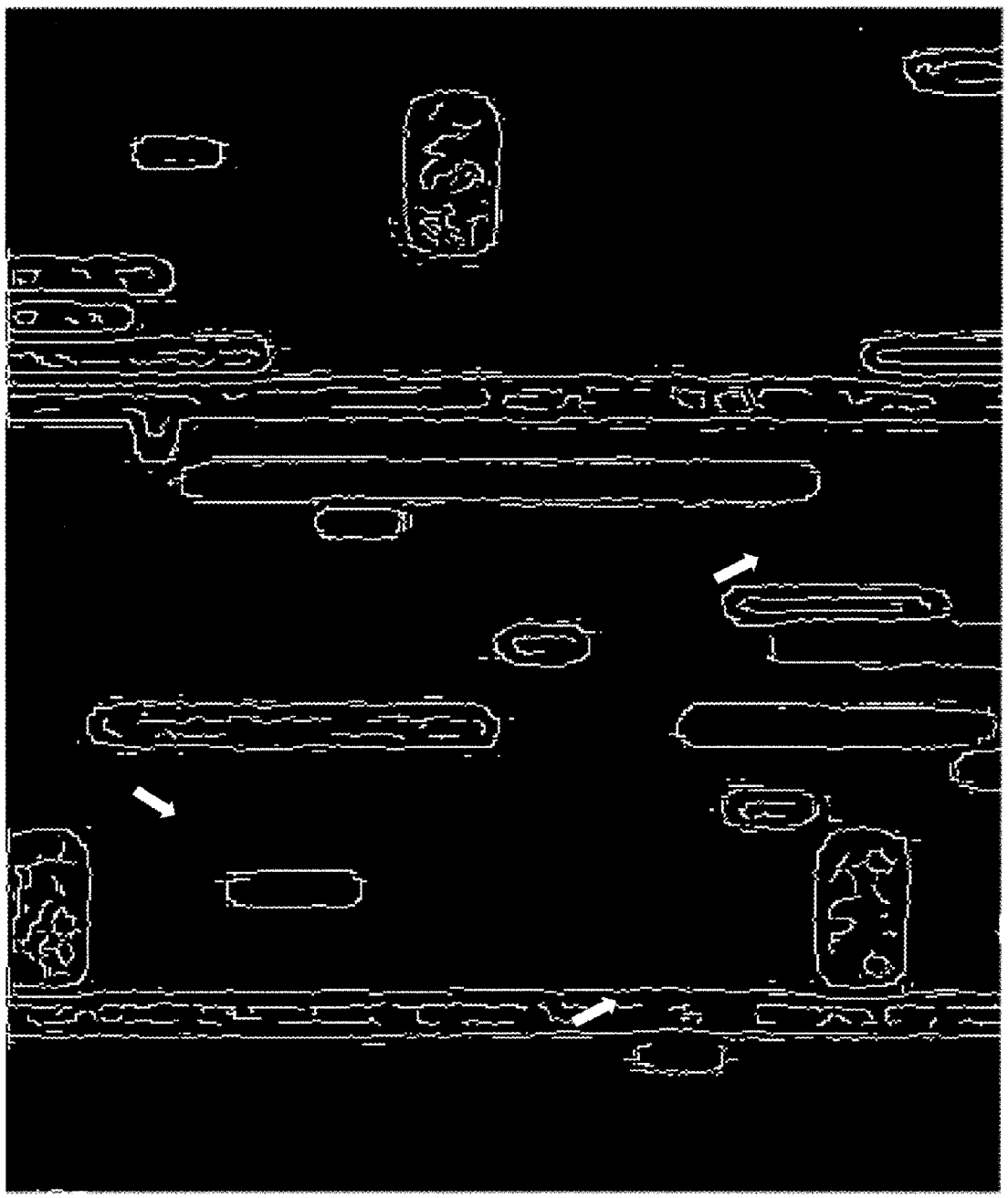
FIG. 17 shows a picture image in case an interconnect contour is extracted by a method of detecting a contrast image of a semiconductor element shown in FIG. 3 by conventional canny edge detection.
Figure 18:
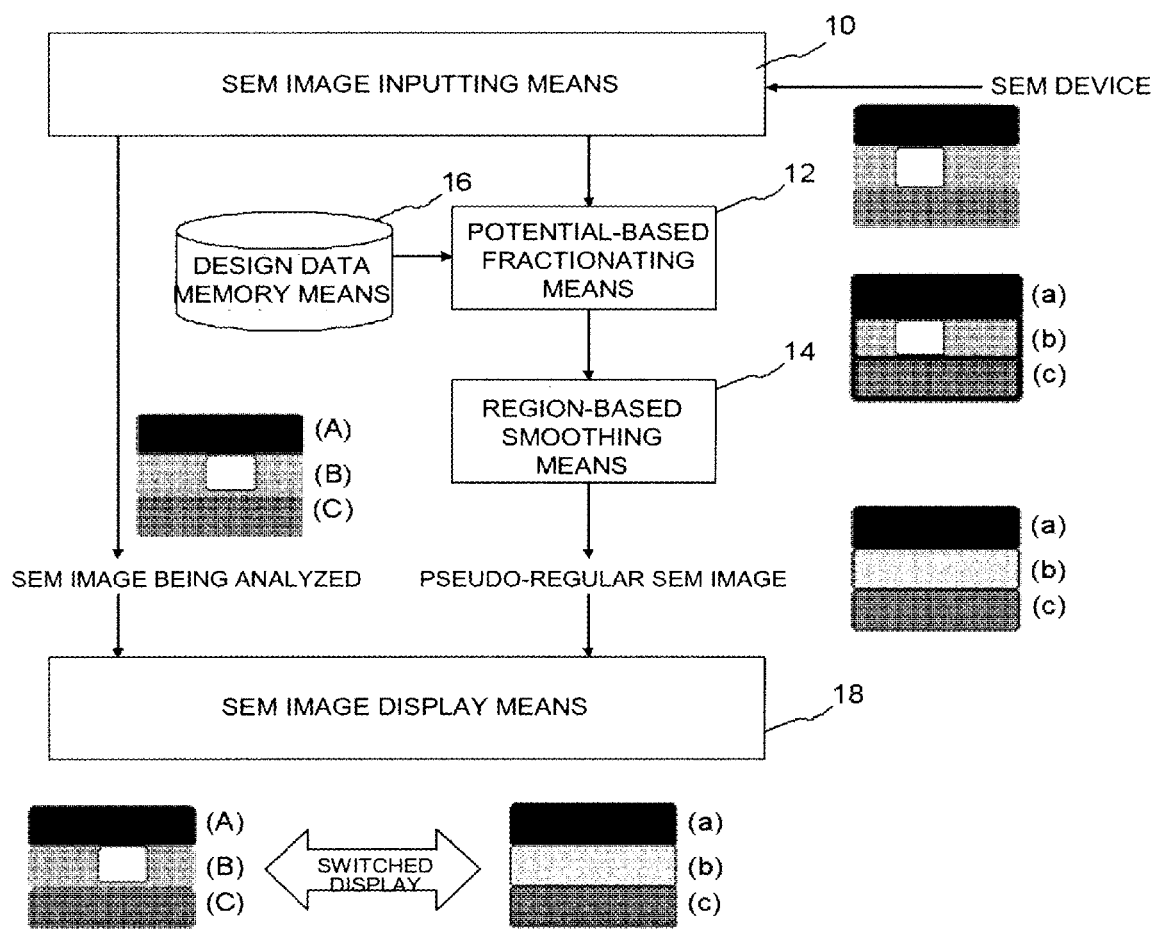
FIG. 18 is a block diagram showing a conventional device for analysis for a semiconductor element shown in Patent Document 4.

FIG. 17 shows, for comparison, a picture image corresponding to a potential contrast image of the semiconductor element of FIG. 3, an edge of which has been detected by a canny edge detection method explained above as a conventional technique. In comparison with routine picture image data, as an object of conventional canny edge detection, a potential contrast image of the semiconductor element, such as a secondary electron image, is obscure in its interconnect boundary. Hence, the detected edge is noisy and non-continuous, so that the figure is not an ideal one. For example, if it is attempted to detect an interconnect pattern by canny edge detection, as indicated by open (white) arrows, the contour of the interconnect pattern may not be detected because of the presence of non-continuous portions. Hence, the contrast of the interconnect pattern also may not be detected.

Conversely, with the method of the exemplary embodiment 1, interconnect patterns may automatically be extracted if the contrast threshold value is properly set in the interconnect contrast extraction processing (step S4). It is unnecessary for the operator to be conscious of the contour. For example, if the interconnect pattern is noisy, the contrast of the interconnect pattern may correctly be extracted by removing the noise at the outset by the noise removing processing (step S2). Moreover, the noise in the contour part may be removed by the shift processing (step S7) following the extraction of the interconnect contrast. In addition, since the color grade number reducing processing is carried out automatically by the processing of reducing the number of color grades (step S3), the contrast threshold value may be set or changed by the processing of extraction of the interconnect contrast.

Exemplary Embodiment 2

Exemplary Embodiment of a Processor for Processing a Contrast Picture Image of a Semiconductor Element (Overall Configuration of the Contrast Picture Image Processor)

Figure 12:
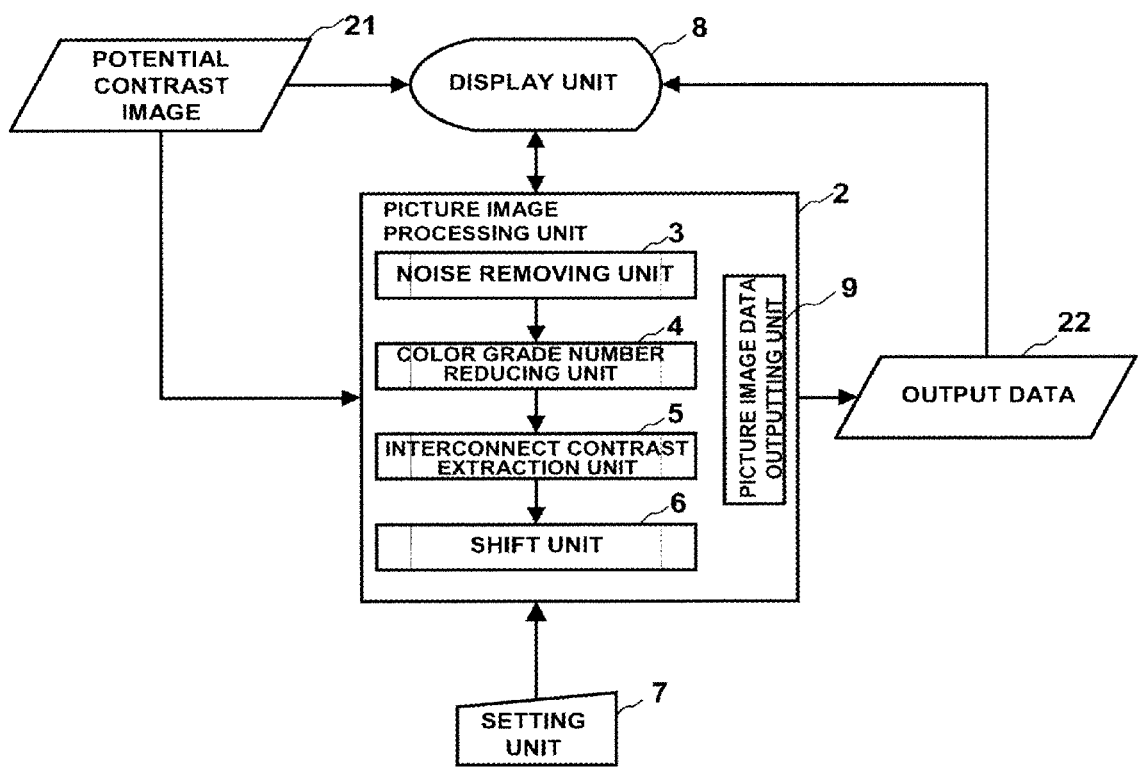
FIG. 12 is a block diagram showing an overall configuration of a processor for processing a contrast picture image of a semiconductor element according to an exemplary embodiment 2.

A processor for processing a contrast picture image of a semiconductor element according to an exemplary embodiment 2 will now be explained. FIG. 12 is a block diagram showing a processor 1 for processing a contrast picture image of the semiconductor element according to the exemplary embodiment 2. With the use of the contrast picture image processor 1 of the exemplary embodiment 2, the contrast picture image processing method of the exemplary embodiment 1 may readily be carried out without the necessity of performing complicated picture image processing using the combination of larger numbers of devices or programs.

The overall configuration of the processor for processing the contrast picture image of the semiconductor element of the exemplary embodiment 2 will now be explained with reference to FIG. 12. A picture image processing unit 2 receives a potential contrast image 21, obtained from a device for analysis, such as SEM, to perform picture image processing thereon. The picture image processing unit thus outputs a contrast image of an interconnect pattern extracted, a contrast image of the intermediate level and parameters, exemplified by coordinates, as output data 22. A setting unit 7 allows an operator to input settings or changes in the settings of the parameters needed for the picture image processing by the picture image processing unit 2. The potential contrast image 21, as picture image input data for the picture image processing unit 2, picture data being processed by the picture image processing unit 2, output data 22 and a setting picture image surface to allow an operator to enter settings on the setting unit 7, are demonstrated on a display unit 8. The operator may select, subject to setting on the setting unit 7, which of the above displays is to be demonstrated as a picture image surface on the display unit 8.

The picture image processing unit 2 includes a noise removing unit 3, a color grade number reducing unit 4, an interconnect contrast extraction unit 5, a shift unit 6 and a picture data outputting unit 9. The noise removing unit 3, color grade number reducing unit 4, interconnect contrast extraction unit 5 and the shift unit 6 respectively execute the noise removing processing (step S2), a color grade number reducing processing (step S3), an interconnect contrast extraction processing (step S4) and shift processing (step S7) in the processing flowchart of FIG. 1 of the exemplary embodiment 1. The picture data outputting unit 9 outputs the input potential contrast image 21 or picture data about to be processed, being processed or following the processing by the noise removing unit 3, color grade number reducing unit 4, interconnect contrast extraction unit 5 or by the shift unit 6, as the output data 22.

(Setting Picture Image Surface of a Contrast Picture Image Processor)

Figure 13:
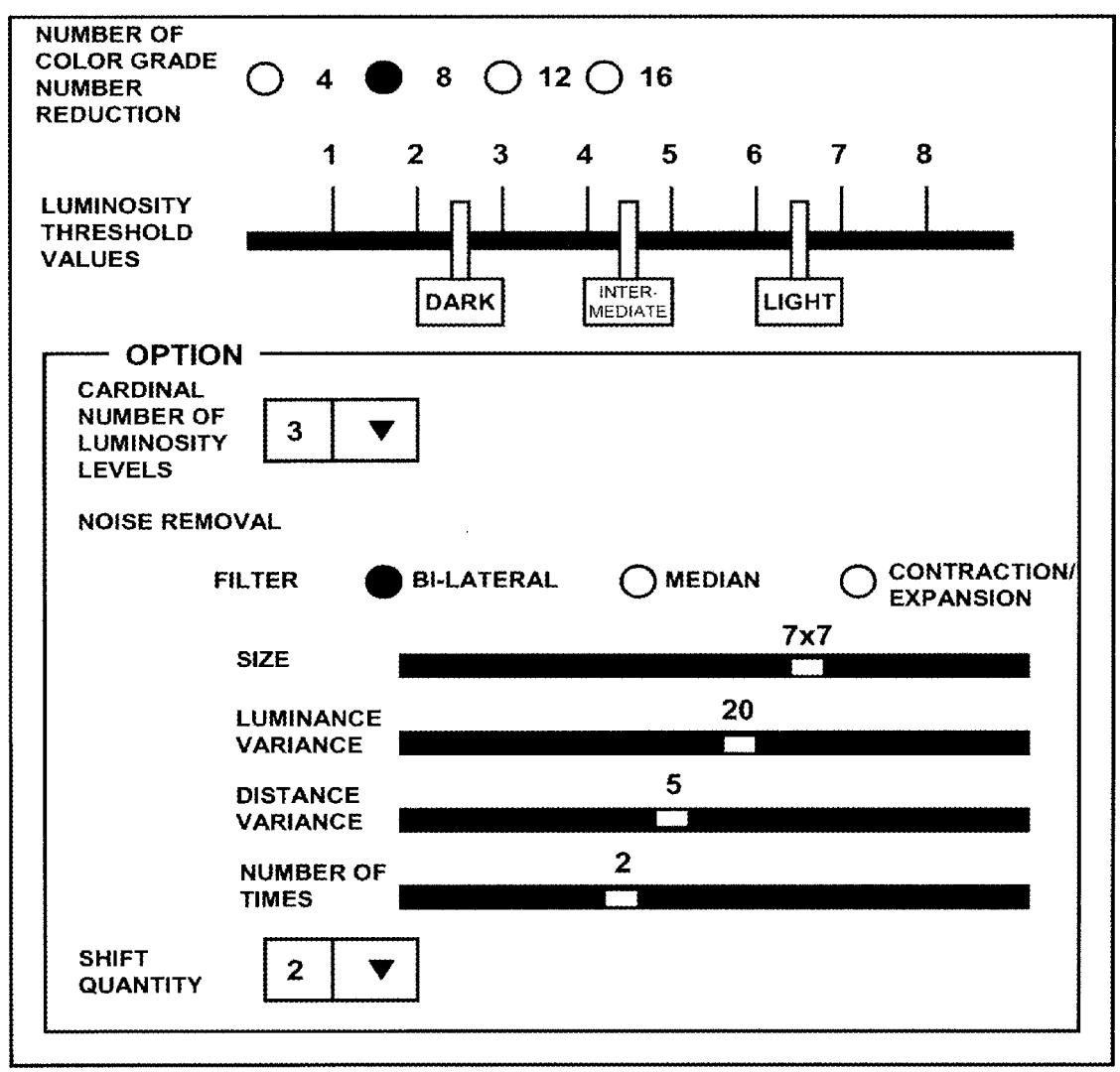
FIG. 13 shows a setting picture image surface of the exemplary embodiment 2.

A setting picture image surface on which the setting unit 7 sets picture image processing parameters will now be explained. FIG. 13 shows an example setting picture image surface for the setting unit 7. The picture image of FIG. 13 is demonstrated on the display unit 8. A variety of settings may be made by the operator from the picture image to select picture image processing parameters. In FIG. 13, the 'reduced number of color grades' and the 'luminosity threshold values' may be set by a staff operator in response to the contrast of the contrast image of the semiconductor element being analyzed. The 'option' in the lower part may be set by an expert well versed in failure analysis of the semiconductor element, picture image processing of potential contrast images or in characteristics of the contrast picture image processor 1. Among the parameters that may be set on the picture image surface, the 'number of color grades reduced' indicates to which number the number of color grades (number of grades of luminosity) is to be reduced and the number of color grades (number of grades of luminosity) following the color grade reduction. The 'reduced number of color grades' (number of contrast grades) is adapted to be selected by radio buttons out of '4 grade colors', '8 grade colors', '12 grade colors' and '16 grade colors', when the color grade number reducing unit 4 executes the processing of color grade number reduction of the exemplary embodiment 1 (step S3). Here, '8 grade colors' is selected.

The 'luminosity threshold values' is an indication for setting contrast threshold values of respective contrasts when the interconnect contrast extraction unit 5 executes the processing of interconnect contrast extraction of step S4. To which number of levels the contrast is to be fractionated in executing the processing of interconnect contrast extraction (step S4) is set by the 'cardinal number of luminosity levels' of the 'option'. Since the 'cardinal number of luminosity levels' of the 'option' is set at '3', three slide bars of 'dark', 'intermediate' and 'light' are demonstrated. Viz., the number of the slide bars, demonstrated in the 'luminosity threshold values', depends on the number as set by the 'cardinal number of luminosity levels'. The numbers '1' to '8', indicated above the bar 'luminosity threshold values', denote the number of the color grades (grades of luminosity) following the reduction of the number of color grades as set in 'the number of color grade reduction'. Since '8' is here set in the 'number of color grade reduction', '1' to '8' are displayed as the numbers above the slide bar.

The three slide bars of 'dark', 'intermediate' and 'light' are adapted to be selected out of eight alternative numbers of 'eight color grades' as set in the 'number of color grade reduction'. It is noted that, out of the three slide bars, the slide bar of 'light' necessarily selects a number greater than the 'intermediate' slide bar, while the slide bar of 'dark' necessarily selects a number smaller than the 'intermediate' slide bar.

The 'cardinal number of luminosity levels' of the 'option' sets the number of contrast (luminosity) levels to which luminosity is to be fractionated in the processing of interconnect contrast extraction, as already explained.

The 'noise removal' sets parameters of a noise filter in case the noise removing unit 3 executes the processing of noise removal (step S2). It is noted that a filter used as a noise filter may be selected by radio buttons out of three sorts of filters 'bilateral', 'median' and 'contraction/expansion'. Here, 'bilateral' is selected. As noise filter parameters, 'size', 'variance of luminance', 'variance of distance' and 'number of times' of use of the filter, are selectable.

By 'quantity of shift', the number of pixels by which the contour of an interconnect pattern is shifted when the shift unit 6 executes the shift processing (step S7).

Since the setting picture image surface as shown in FIG. 13 is provided, it is sufficient to set standard values for the cardinal numbers of luminosity levels, used for decision, the noise removing methods and the quantity of contour shifting, for example. The operator may then complete picture image processing simply by changing the threshold values of the reduced number of color grades and the luminosity levels. The threshold value of luminosity is set for the reduced number of color grades (luminosity grades), and hence the number of settable combination is limited, thus providing for facilitated setting.

Figure 14:
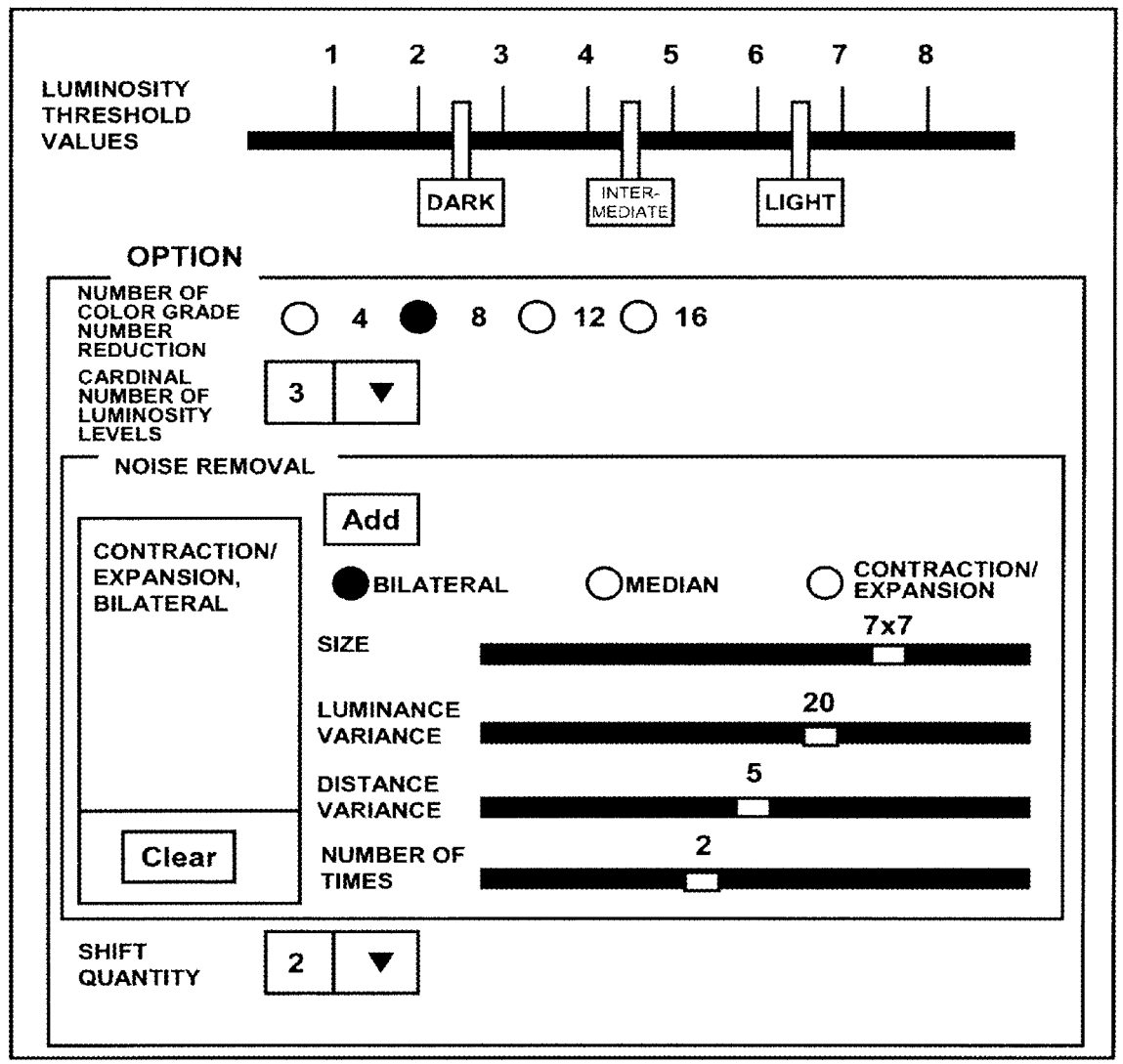
FIG. 14 shows another setting picture image surface of the exemplary embodiment 2.

FIG. 14 shows another example of setting picture image screen. The portions which are approximately the same as those of the setting picture image screen of FIG. 13 are not explained and only different portions are explained. In FIG. 14, the reduced number of color grades is an option. Hence, a staff operator has merely to set the 'luminosity threshold values' in keeping with the contrast of the potential contrast image in executing the contrast picture image processing of the semiconductor element.

In the parameter setting of 'noise removal', which is the setting of the 'option', a plurality of filters may in duplication be selected in a check box. If the noise filter type and parameters of the noise filter are set by radio buttons, and an 'Add' button is clicked, a filter name is added in a left-side window. If the filter demonstrated in the left-side window is clicked, the corresponding parameters are demonstrated in a right-side column. If the filter displayed in the left-side window is selected and a 'Clear' button is clicked, the noise filter is cleared. The order of use of the filters may be changed by dragging the filer names in an up-and-down direction. Otherwise, the setting picture image surface is the same as that of FIG. 13.

Figure 15:
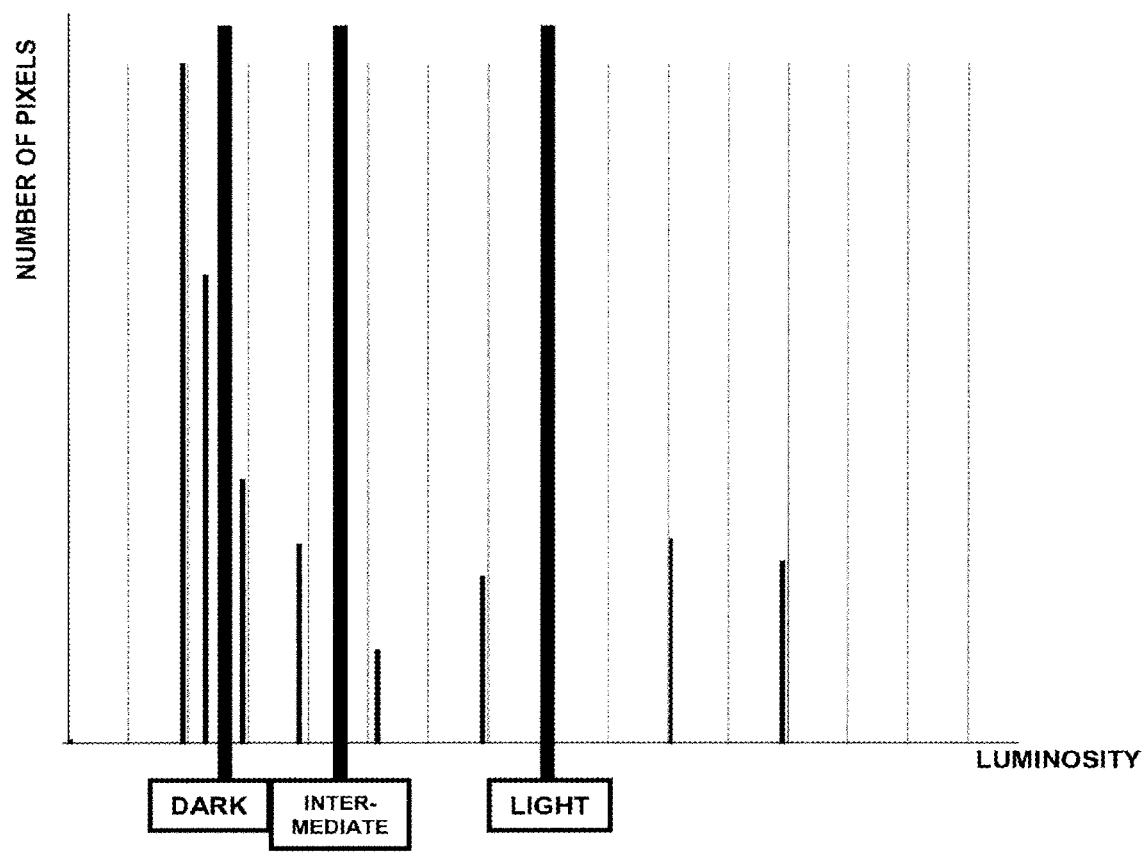
FIG. 15 shows a further setting picture image surface of the exemplary embodiment 2.

FIG. 15 is a further setting picture image screen for the 'luminosity threshold values'. The setting picture image screen for the 'luminosity threshold values' depends on the contrast of the potential contrast image of the semiconductor element and is a parameter the setting and the adjustment of which are absolutely needed for an operator. In the setting picture image screen of FIG. 15, the 'luminosity threshold values' may be set based on a histogram of the reduced-color-grade-number contrast image as obtained by the processing of reducing the number of color grades (step S3).

It is noted that FIGS. 13 to 15 show preferred examples of the setting picture image screen. It is possible to set or change parameters of each picture image processing from the default setting by the setting unit 7 as necessary. The setting picture image screens other than those shown in FIGS. 13 to 15 may, of course, be used provided that the setting picture image screen used allows for a facilitated operation by the operator.

In the processor 1 for processing the contrast picture image of the semiconductor element, described above, a contrast image of a semiconductor element obtained by a device for analysis, such as SEM, a picture image being processed or a picture image obtained on picture image processing, is displayed in the display unit 8. The contour coordinates of the interconnect and luminosity values thereof, obtained from the results of the processing, are displayed on the display unit 8. A picture images before, in the course of and following the picture image processing, and the layout of design data, overlaid thereon, may be displayed in the display unit 8. There are also picture image screens for setting picture image processing parameters. These parameters include parameters used in the noise removing processing (step S2), the number of color grades for reduction as specified in the color grade number reducing processing (step S3), the threshold values used in the interconnect contrast extraction processing (step S4) and the number of pixels shifted in the shift processing (step S7). It is also possible to save the picture images and parameters, obtained from the result of the picture image processing, contour coordinates of interconnects and luminosity thereof, as output data 22 (FIG. 12).

In this manner, parameters of picture image processing may suitably be changed as the results of the picture image processing are confirmed. The contour coordinates within the picture image may also be taken out for matching the coordinates to design data.

The various portions of the processor 1 for processing the contrast picture image of the semiconductor element may be composed of a dedicated hardware, such as a processor dedicated to picture image processing. Or, they may also be composed of a processor, such as general-purpose EWS or personal computer, and a program for picture image processing. In addition, the contrast picture image processor 1 may be connected over the Internet or an intranet with an operator in a remote place. In this case, the operator may enter data from a terminal at the remote place to the setting unit 7, while the contrast picture image processor 1 may transmit picture image data to the operator' terminal in the remote place to display the picture image data at the terminal. In such case, the terminal at the remote place may be a general-purpose terminal, provided that the terminal is able to make setting input and picture image display. It is not particularly necessary to provide dedicated hardware or software on the side the terminal.

Exemplary Embodiment 3

Exemplary Embodiment of a Contrast Picture Image Processing Program for a Semiconductor Element An exemplary embodiment 3 is directed to a computer program that allows a general-purpose processor, such as EWS or personal computer, to operate as a contrast picture image processor of the exemplary embodiment 2. The contrast picture image processor of the exemplary embodiment 2 is able to carry out the method for processing the contrast picture image of the semiconductor element of the exemplary embodiment 1 as already explained in connection with the exemplary embodiment 2. Hence, with the use of the program of the exemplary embodiment 3, it is possible for the general-purpose computer, such as EWS or personal computer, to carry out the method for processing the contrast picture image of the semiconductor element of the exemplary embodiment 1.

Figure 16:
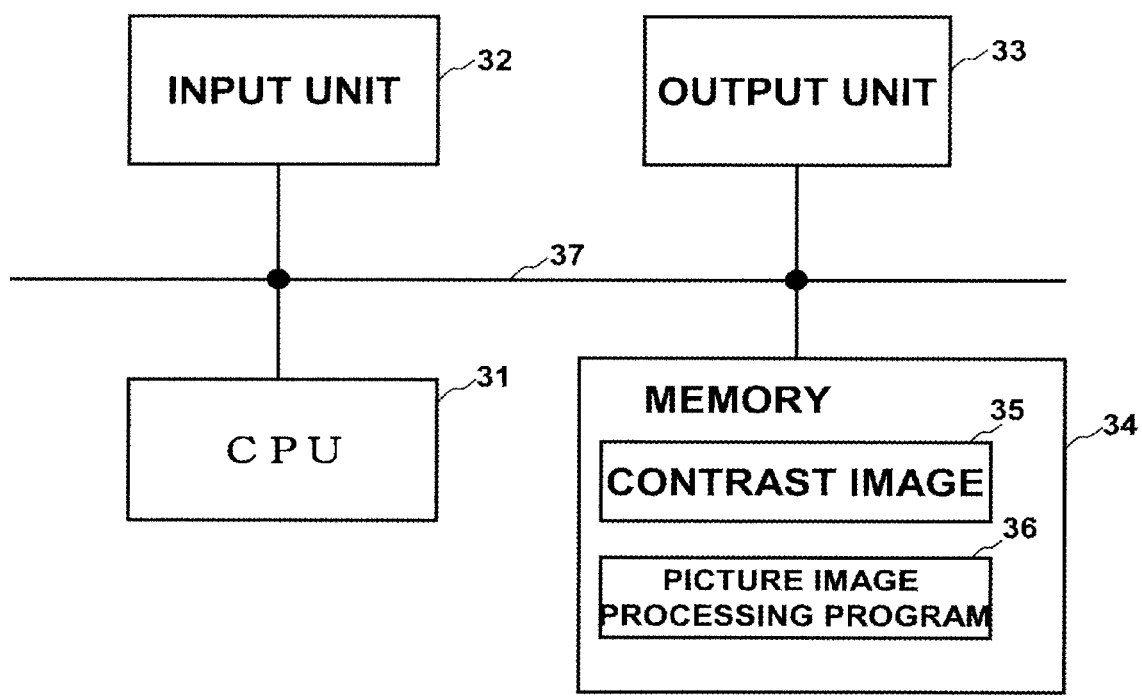
FIG. 16 is a block diagram showing a hardware structure of a computer that may be used to execute a program for processing a contrast picture image of a semiconductor element according to an exemplary embodiment 3.

FIG. 16 is a block diagram showing a hardware configuration of a computer that may be used to run the program for processing a contrast picture image of a semiconductor element according to the exemplary embodiment 3. Referring to FIG. 16, the hardware configuration of a computer 30 that may be used to run the program for processing a contrast picture image of a semiconductor element according to the exemplary embodiment 3 will now be described.

A memory 34, composed of a memory, a hard disc device and so on, holds a contrast picture image processing program 36 or a contrast picture image 35, such as a contrast image before picture image processing, obtained from a device for analysis, such as SEM, a picture image being processed or a picture image following the processing. In the picture image following the processing, interconnect patterns have been extracted from one contrast level to another. In addition to the contrast picture image 35 or the contrast picture image processing program 36, other design data may be adapted to be stored in the memory 34. The design data may be exemplified by various processing parameters, as set on the setting picture image screens, contour coordinates/contrasts of the interconnect patterns, and layout patterns of the semiconductor element.

The contrast image entered from the device for analysis, corresponding to the potential contrast picture image 21 of FIG. 12, as entered in step S1 of FIG. 1, and the contrast image freed of the noise by the noise removing processing (step S2 of FIG. 1), are to be stored in respective different portions of the memory 34 that stores the contrast picture image 35. In addition, the contrast image, whose number of color grades has been reduced by the color grade number reducing processing (step S3), is also stored in a different portion of the memory. An interconnect pattern image (contrast image), extracted by the interconnect contrast extraction processing (step S4), is also stored in a further different portion of the memory. An interconnect pattern image (contrast image), freed of the noise of the contour part by the shift processing (step S7), is also stored in another different portion of the memory. The images thus stored are preferably kept until the completion of the contrast picture image processing. The data used in the contrast picture image processing, inclusive of the respective picture data, are preferably adapted to be stored in a non-volatile memory means, such as hard disc, CD, DVD or flash memories. It is because the process of the contrast picture image processing is desirably able to be confirmed later or the contrast picture image processing is desirably able to be re-done as from an intermediate stage.

An input unit 32 includes an input device, such as a keyboard or a mouse, and enters parameters of various processing operations as set by an operator on a setting picture image screen. An output unit 33 outputs, in addition to the contrast image 35, the contour coordinates of the interconnect, obtained as a result of the processing, the contrast thereof, and layout design data that may be displayed overlaid on the contrast image, as display data. The contrast data 35, contour coordinates of the interconnects, obtained as a result of processing, and contrast data thereof, may be output as output data to external storage devices, such as DVD or CD. A CPU 31 runs a contrast picture image processing program 36, stored in the memory 34, and executes contrast picture image processing. The CPU 31, input unit 32, output unit 33 and the memory 34 are interconnected over a bus 37. It is noted that the contrast picture image processing program 36 may be stored in the memory 34 of the computer 30 via a recording medium such as CD, VD, blue-ray disc or a flash memory. In case the bus 37 is connected to a network, such as the Internet or an intranet, the contrast picture image processing program 36 may be installed on-line on the computer 30.

As described above, the program 36 for processing the contrast picture image of the semiconductor element of the exemplary embodiment 3 may be installed in the memory 34 of the computer 30, whereby the computer 30 may operate as the processor 1 for processing the contrast picture image of the semiconductor element of the exemplary embodiment 2. Moreover, if the contrast picture image processing program is run on the computer 30, the method for processing the contrast picture image of the semiconductor element of the exemplary embodiment 1 shown in FIG. 1 may be executed by the computer 30.

In the above description of the exemplary embodiments 1 to 3, the contrast image is not limited to a potential contrast image observed in a SEM or FIB. It is sufficient that a picture image is detected as an electrical signal, infrared light, visible light, ultra-violet light, laser, X-rays, electrons, ions, ultrasonic wave or vibrations as a result of supplying an electrical signal, infrared light, visible light, ultra-violet light, laser, X-rays, electrons, ions, ultrasonic wave or vibrations to an LSI.

The semiconductor element 50, as an object for analysis, is not limited to a device sliced as a chip from a wafer, but may be in the wafer state.

The above described exemplary embodiments 1 to 3 may be summarized as following. It is noted that, in the summary, shown below, the figures or the reference numerals referred to are given only by way of examples of the exemplary embodiments and are not intended to limit the scope of the invention.

An example of the method for processing the contrast picture image according to an exemplary embodiment of the present disclosure is shown in FIG. 1. The method includes the processing of automatically reducing the number of color grades (step S3), the processing of extracting the contrast of the interconnect (step 4) and the processing of shifting (step S7). In the processing of reducing the number of color grades, the number of color grades in the contrast image of the semiconductor element 50, such as the image shown in FIG. 3, obtained from the device for analysis, such as SEM, is automatically reduced in agreement with the contrast of the contrast image. In the processing of extracting the contrast of the interconnect, the pixels contained in the contrast image, whose number of color grades has been reduced, are classified based on pre-set contrast threshold values as reference. By so doing, an interconnect pattern, fractionated into a plurality of contrast values, is extracted. The pre-set contrast threshold values may, for example, be the 'dark', 'intermediate' and 'light' threshold values as set on the slide switches of the 'luminosity threshold values' of FIG. 13. The processing of shifting the contour of the interconnect pattern removes the noise contained in the contour of the interconnect pattern. The contrast image of the semiconductor element, obtained from the device for analysis (FIG. 3), is fractionated into contrast pattern portions of preset contrast levels and extracted. FIG. 11 shows an example result of the processing.

Preferably, an example processing of extracting the interconnect contrast (step S4) is shown in FIG. 10. The example processing of extracting the interconnect contrast includes (1) step S(22) of turning the contrast image reduced in the number of color grades into an image of bi-level contrast or luminosity, using a preset first contrast threshold value as reference, to extract an interconnect pattern of a first contrast.

The example processing of extracting the interconnect contrast also includes steps (S24 to S28). In these steps S24 to S28, the number of contrast threshold values is set to N, where N is an integer not less than 2. In these steps, the processing of turning a contrast image obtained after excluding the interconnect pattern already extracted in the reduced color grade number contrast image, into an image of bi-level contrast or luminosity, using a K'th contrast threshold value out of the N-number of the contrast threshold values as reference. To do so extracts an interconnect pattern of the K'th contrast where K is an integer. This sequence of operations is repeated as the value of K is incremented by 1 from K=2 until K=N each time, thereby extracting interconnect patterns fractionated to N levels of contrast. For example, with the use of pre-set N contrast threshold values, an interconnect pattern fractionated into N different contrast levels may be obtained, in which the N contrast levels range from the most extreme threshold value in order.

In case a desired contrast-based interconnect pattern has not been obtained, the contrast-based interconnect pattern extraction may be re-done as the threshold values are varied in the processing of interconnect contrast extraction. Suppose that, in the processing flowchart of FIG. 1, an operator scrutinized into the result of the processing as from step S4 and found that the desired contrast-based interconnect pattern has not been obtained. In this case, the operator may act on the slide switch that sets the 'luminosity threshold value' of FIG. 13 etc. to change the threshold value to re-do the processing of interconnect contrast extraction (step S4 of FIG. 1). If necessary, a picture image being processed at any stage of an arbitrary processing, out of the processing operations of the respective steps of FIG. 1, may be demonstrated for recognition by an operator in proceeding with picture image processing. The any stage of an arbitrary processing may be each processing stage in case of performing a plurality of noise filtering processing operations or a stage of proceeding with extraction of an interconnect pattern for each threshold value during the processing of interconnect contrast extraction.

In the color grade number reducing processing (step S3 of FIG. 1), it is desirable to reduce the number of color grades (the number of grades of luminosity), without exterior criterion, with the use of the data clustering method. Viz., in the color grade number reducing processing, it is necessary to set in advance the number of color grades (the number of grades of luminosity) of the color grade number reducing operation, however, it is unnecessary to set the threshold value at the outset. It is preferred to reduce the number of color grades (the number of grades of luminosity) in keeping with the contrast of the contrast image automatically set in keeping with the contrast of the contrast image. With the data clustering method, the number of color grades (the number of grades of luminosity) may be reduced to an as-set number of color grades of the contrast image without the exterior criterion. The color contrasts of the respective colors following the color grade number reduction may be automatically set in keeping with the contrast distribution of the contrast image.

Preferably, step S2 of pre-removing the noise contained in a contrast image is carried out in advance of the color grade number reducing processing. If the contrast image is noisy, the image is preferably freed of noise at the outset.

In the noise removing processing, one or more of a plurality of noise filters is selected and used for noise removal. The reason is that an optimum filter to be used for removing the noise differs with the noise contained in the contrast image.

In the noise removing processing, any number of filters, inclusive of the bilateral filter, median filter and the contraction/expansion filter that may arbitrary be set for the respective parameters, may be selected and used in desired order a desired number of times to remove the noise. Composite noises may also be removed.

Referring to FIG. 2, there is shown, as an example, a contrast picture image processor 1 adapted for processing a contrast image of a semiconductor element according to an exemplary embodiment of the present disclosure. The contrast picture image processor 1 includes a color grade number reducing unit 4, an interconnect contrast extraction unit 5, a shift unit 6 and a picture image data outputting unit 9. The color grade number reducing unit inputs a contrast image of a semiconductor element 50 as obtained from a device for analysis, such as SEM, and automatically reduces the number of color grades (number of grades of luminosity or contrast) of the contrast image based on the contrast distribution of the input contrast image to output the color-grade-number-reduced contrast image. The interconnect contrast extraction unit inputs the color-grade-number-reduced contrast image to classify pixels contained in the color-grade-number-reduced contrast image with the use of a preset contrast threshold value as a reference. The interconnect contrast extraction unit thus extracts an interconnect pattern image fractionated to a plurality of contrasts. The shift unit inputs the interconnect pattern image, freed of the noise of the contour part of the interconnect contained in the interconnect pattern image, by shifting the contour part. The picture image data outputting unit outputs an interconnect pattern image, freed by the shift unit 6 of the noise of the contour part, as picture image data.

The interconnect contrast extraction unit 5 may convert the contrast image, having the reduced number of color grades, into an image of bi-level contrast or luminosity, using the first contrast threshold value as reference, to extract an interconnect pattern of a first contrast level. Following the extraction of the interconnect pattern of the first contrast level, the interconnect contrast extraction unit performs the processing of converting the contrast image, obtained after removing the interconnect pattern already extracted from the color-grade-number-reduced contrast image, into an image of bi-level contrast or luminosity, using a K'th contrast threshold value out of the N-number of the contrast threshold values as reference, where N is an integer not less than 2. Doing so extracts an interconnect pattern of the K'th contrast level. This sequence of operations is repeated as the value of K is incremented by 1 from K=2 until K=N each time, thereby extracting interconnect patterns fractionated into N contrast levels. The interconnect contrast extraction unit 5 of the above mentioned configuration may be applied in case the number of times N of classification operations of the interconnect pattern to be fractionated is an arbitrary integer not less than 2.

The contrast picture image processor further includes a setting unit 7 that allows a setting picture image screen, such as that shown in FIGS. 13 to 15, to be displayed to allow a user to enter changes in parameters of picture image processing including a contrast threshold value. The setting of the contrast threshold value to be used by the interconnect contrast extraction unit 5 may be made on the setting picture image screen. The picture image data outputting unit 9 outputs picture image data at an optional processing stage as display data for confirmation by the operator. The optional processing stage of the picture image data refers to any processing stage up to an output stage where the interconnect pattern image corresponding to the input contrast image 21 of the semiconductor element freed of the noise of the contour part by the shift unit 6 is obtained. In case the picture image being processed at an arbitrary stage can be displayed subject to setting on the setting unit 7, the operator may change the parameter to redo the processing as from the arbitrary processing stage in question. In particular, in the interconnect contrast extraction unit 5, the necessity for changing the threshold value in consideration of contrast levels of the contrast image being processed may arise from time to time. Hence, the threshold value may also be changed as the operator verifies the picture image displayed.

Preferably, the color grade number reducing unit 4 is able to reduce the number of color grades, without using exterior criterion, with the use of the data clustering method. It is noted that the color grade number reducing processing by the color grade number reducing unit 4 is a pre-processing to the processing for interconnect contrast extraction. Hence, by using the data clustering method, in which pixels are classified without exterior criterion, the color (herein contrast or luminosity) following the color grade number reduction (reduction in the number of levels of contrast or luminosity) may automatically be set to effect classification as the operator is not bothered with an operation of setting threshold values.

Preferably, the noise removing unit 3 that removes the noise contained in the contrast image of the input semiconductor element is further provided, and the color grade number reducing unit 4 inputs the contrast image freed of the noise by the noise removing unit 3. In case the contrast image is noisy, the noise is preferably removed at the outset.

Also preferably, the noise removing unit 3 includes a plural number of sorts of noise filters, and is configured for removing the noise using one or more noise filters selected from the plural number of sorts of the noise filters. For example, setting picture image screens, such as those shown in FIGS. 13 and 14, may be displayed by the setting unit 7 to allow for selecting the noise filters.

The noise removing unit 3 removes the noise contained in the contrast image 21 of the semiconductor element entered. The noise removing unit 3 includes any number of different sorts of filters, inclusive of the bilateral filter, median filter and the contraction/expansion filter. The setting unit 7 is designed to set desired parameters in the desired sorts of the noise filters, out of the plural different sorts of the noise filters, in a desired order a desired number of times, in order to remove the noise. The setting unit 7 may display a setting picture image screen shown in FIG. 14 and set arbitrary parameters in the noise filters of the arbitrary sorts out of the plural sorts of the noise filters. These parameters may be selected in a desired sequence a desired number of times in order to remove the noise. The color grade number reducing unit 4 desirably inputs a contrast image freed of the noise by the noise removing unit 3. The setting unit 7 may display a setting picture image screen shown in FIG. 14 and set arbitrary parameters in the arbitrary sorts of the noise filters out of the plural sorts of the noise filters. These filters may be selected in a desired sequence a desired number of times in order to effect noise removal.

A contrast picture image processing program (computer program) for a semiconductor element according to an exemplary embodiment of the present disclosure may allow a computer, configured as shown in FIG. 16, to perform a color-grade-number-reducing processing, an interconnect contrast extraction processing, a shift processing and a picture image data outputting processing. In the color-grade-number-reducing processing, a contrast image of a semiconductor element, obtained from a device for analysis, is entered to the computer. The number of color grades (herein the number of grades of luminosity or contrast) of the contrast image is automatically reduced based on the contrast distribution of the input contrast image, and the resulting color-grade-number-reduced contrast image is output. In the interconnect contrast extraction processing, the color-grade-number-reduced contrast image is entered, and pixels contained in the color-grade-number-reduced contrast image are classified, using a pre-set threshold contrast value as a reference. An interconnect pattern image, fractionated to a plurality of contrast levels, is extracted. In the shift processing, the interconnect pattern image, extracted by the interconnect contrast extraction processing, is entered, and the noise of the contour part of the interconnect, contained in the interconnect pattern image, is removed by shifting the contour portion. In the picture image data outputting processing, the interconnect pattern image, freed of the noise of the contour part by the shift processing, is output as picture image data. Viz., given that the contrast picture image processing program 36 is installed in the general-purpose computer 30, shown in FIG. 16, the computer 30 may operate as the contrast picture image processor 1 for processing the contrast picture image of the semiconductor element shown in FIG. 12 so that it is possible to have the computer 30 execute the contrast image processing method for processing the contrast image of the semiconductor element shown in FIG. 12.

The particular exemplary embodiments or examples may be modified or adjusted within the gamut of the entire disclosure of the present disclosure, inclusive of claims, based on the fundamental technical concept of the disclosure. Further, a variety of combinations or selection of elements disclosed herein may be made within the framework of the claims. Viz., the present disclosure may cover a wide variety of modifications or corrections that may occur to those skilled in the art in accordance with the entire disclosure of the present invention, inclusive of claims and the technical concept of the present invention.

What is claimed is:

1. A method for processing a contrast picture image of a semiconductor element comprising:
- a color grade number reducing processing that automatically reduces a number of color grades of said contrast picture image of the semiconductor element, obtained from a device for analysis, in keeping with the contrast of said contrast picture image;
- an interconnect contrast extraction processing that classifies pixels contained in said contrast picture image, whose number of color grades has been reduced, in accordance with a preset contrast threshold value as reference, to extract an interconnect pattern fractionated into a plurality of number of contrasts, wherein said interconnect contrast extraction processing includes:
  - (1) turning said contrast image, whose number of color grades has been reduced, into a bi-level image, using a preset first contrast threshold value as reference, to extract an interconnect pattern of a first contrast level; and
  - (2) turning a contrast image, obtained after excluding the interconnect pattern already extracted in the color-grade-number-reduced contrast image, into another bi-level image, using a K'th contrast threshold value out of an N-number of the contrast threshold values as reference, where N is the number of said contrast threshold values and is an integer not less than 2, to extract an interconnect pattern of the K'th contrast level; the sequence of operations of turning the contrast images into the bi-level images and extracting the interconnect patterns being repeated as the value of K is incremented by 1 from K=2 until K=N each time, where K is an integer;
  - whereby the interconnect patterns fractionated into N levels of contrast is extracted; and a shift processing that removes noise contained in a contour portion of said interconnect pattern by shifting said contour portion; whereby an interconnect pattern contained in said contrast image of said semiconductor element obtained from said device for analysis is fractionated into a plurality of preset contrasts to be extracted.

2. The method for processing a contrast picture image of a semiconductor element according to claim 1, wherein in case the interconnect pattern fractionated into desired contrast levels has not been obtained, extraction of the interconnect pattern based on the contrast level is redone as the threshold value is changed to a new value.

3. The method for processing a contrast picture image of a semiconductor element according to claim 1, wherein, picture image processing is carried out as a picture image at each of a plurality of optional processing stages is displayed and verified.

4. The method for processing a contrast picture image of a semiconductor element according to claim 1, wherein, said color grade number reducing processing is carried out without exterior criterion using a data clustering method.

5. The method for processing a contrast picture image of a semiconductor element according to claim 1, further comprising:

a noise removing processing that reduces noise contained in the contrast image before said color grade number reducing processing.

6. The method for processing a contrast picture image of a semiconductor element according to claim 5, wherein said noise reducing processing is carried out using a noise filter selected out of a plurality of noise filters.

7. The method for processing a contrast picture image of a semiconductor element according to claim 5, wherein said noise removing processing is carried out by selecting any number of filters in an arbitrary order at any number of times from the group consisting of a bilateral filter, a median filter and a contraction/expansion filter, parameters of which may arbitrarily be set.

8. A device for processing a contrast picture image of a semiconductor element, comprising:

a color grade number reducing unit that receives a contrast image of the semiconductor element obtained from a device for analysis, automatically reduces the number of color grades of the input contrast picture image based on contrast distribution of the input contrast image and that outputs a contrast image having a reduced number of color grades;

an interconnect contrast extraction unit that receives said contrast image having the reduced number of color grades, classifies pixels contained in said contrast picture image, whose number of color grades has been reduced, in accordance with a preset contrast threshold value as reference, to extract an interconnect pattern fractionated into a plurality of contrasts, wherein, with the number of said contrast threshold values being N, N being an integer not less than 2, said interconnect contrast extraction unit executes processing of turning said contrast image, whose number of color grades has been reduced, into a bi-level image, with the use of a preset first one of said contrast threshold values as reference, to extract an interconnect pattern of a first contrast; and processing of turning, in continuation to extraction of the interconnect pattern of the first contrast, another contrast image, obtained after excluding the interconnect pattern already extracted in the color-grade-number-reduced contrast image, into a hi-level image, using a K'th contrast threshold value out of said N-number of the contrast threshold values as reference, to extract an interconnect pattern of the K'th contrast level; the sequence of operations of turning into the bi-level images and interconnect pattern extraction being repeated as the value of K is incremented by 1 from K=2 until K=N each time, where K is an integer;

whereby the interconnect patterns fractionated into N levels of contrast is extracted;

a shift unit that inputs the interconnect pattern image extracted by said interconnect contrast extraction unit and that removes noise contained in a contour portion of said interconnect pattern by shifting said contour portion; and a picture image data outputting unit that outputs an interconnect pattern image, freed of noise of said contour portion by said shift unit, as picture image data.

9. The device for processing a contrast picture image of a semiconductor element according to claim 7, further comprising:

a setting unit that allows a setting picture image screen to be displayed; said setting picture image screen being applied in setting said contrast threshold value used by said interconnect contrast extraction unit; said setting picture image screen allowing an operator to input changes of parameters for picture image processing including said contrast threshold value;

said picture image data outputting unit being so designed that picture image data being processed in any stage until an interconnect pattern image freed of noise in a contour portion of the input contrast image of said semiconductor element is obtained by said shift unit as display data for confirmation by said operator.

10. The device for processing a contrast picture image of a semiconductor element according to claim 8, wherein, said color grade number reducing unit reduces the number of color grades without exterior criterion using a data clustering method.

11. The device for processing a contrast picture image of a semiconductor element according to claim 8, further comprising:

a noise removing unit that removes noise contained in the input contrast image of the semiconductor element; said color grade number reducing unit receiving the contrast image freed the noise by said noise removing unit.

12. The device for processing a contrast picture image of a semiconductor element according to claim 11, wherein, said noise removing unit includes a plurality of noise filters of different sorts and is configured for removing the noise using one or more noise filters selected out of said plurality of sorts of noise filters.

13. The device for processing a contrast picture image of a semiconductor element according to claim 9, further comprising:

a noise removing unit that removes the noise contained in the input contrast image of the semiconductor element;

said noise removing unit including a plurality of noise filters of different sorts including a bilateral filter, a median filter and a contraction/expansion filter;

said setting unit being designed so as to select a noise filter of an any sort, out of said plurality of sorts of noise filters, in a desired sequence at a desired number of times, as a desired parameter is set in the selected noise filter, in order to effect noise removal;

said color grade number reducing unit receiving a contrast image freed of noise by said noise removing unit.

14. A non-transitory computer-readable medium encoded with a computer program for processing a contrast picture image of a semiconductor element, wherein
the program allows a computer to execute a color grade number reducing processing of inputting a contrast image of said semiconductor element, obtained from a device for analysis, automatically reducing the number of color grades of said input contrast image based on the contrast distribution thereof and outputting a contrast image whose number of color grades has been reduced;
an interconnect contrast extraction processing of receiving a contrast image, whose number of color grades has been reduced, classifying pixels contained in said contrast image, whose number of color grades has been reduced, in accordance with a preset contrast threshold value, and extracting an interconnect pattern image fractionated into a plurality of contrasts, wherein,
with the number of said contrast threshold values being N, N being an integer not less than 2,
said interconnect contrast extraction unit initially executes a processing of turning said contrast image, whose number of color grades has been reduced, into a bi-level image, using a preset first one of said contrast thresh values as reference, to extract an interconnect pattern of a first contrast;
said interconnect contrast extraction unit executing a processing of turning, in continuation to extraction of the interconnect pattern of the first contrast, another contrast image, obtained after excluding the interconnect pattern already extracted in the color-grade-number-reduced contrast image, into a bi-level image, using a K'th contrast threshold value out of said N-number of the contrast threshold values as reference, to extract an interconnect pattern of the K'th contrast level; the sequence of operations of turning into the bi-level images and interconnect pattern extraction being repeated as the value of K is incremented by 1 from K=2 until K=N each time, where K is an integer;
whereby the interconnect patterns fractionated into N levels of contrast is extracted;
a shift processing of receiving the interconnect pattern image extracted by said interconnect contrast extraction processing and removing noise of a contour portion of said interconnect included in said interconnect pattern image by shifting said contour portion; and
a picture image data outputting processing of outputting an interconnect pattern image, freed of the noise in said contour portion by said shift processing, as picture image data.

15. The non transitory computer-readable medium encoded with the program for processing a contrast picture image of a semiconductor element according to claim 14 wherein,
the program further includes a setting processing that allows a setting picture image screen to be displayed; said setting picture image screen being applied in setting said contrast threshold value used by said interconnect contrast extraction unit; said setting picture image screen allowing an operator to input changes of parameters for picture image processing including said contrast threshold value;
said picture image data outputting processing including the processing of outputting picture image data being processed in any stage until an interconnect pattern image freed of noise in a contour portion of the input contrast image of said semiconductor element is obtained by said shift unit as display data for confirmation by said operator.

16. The non-transitory computer-readable medium encoded with the program for processing a contrast picture image of a semiconductor element according to claim 14, further comprising:
a noise removing processing of removing the noise contained in said input contrast image of said semiconductor element;
said color grade number reducing operation receiving a contrast image freed of noise by said noise removing processing.

17. The non-transitory computer-readable medium encoded with the program for processing a contrast picture image of a semiconductor element according to claim 15, further comprising:
a noise removing processing of removing the noise contained in the input contrast image of said semiconductor element;
said noise removing processing selecting any sort of the noise filter out of a plurality of sorts of noise filters, including a bilateral filter, a median filter and a contraction/expansion filter, with an arbitrary parameter, in a desired order at a desired number of times, in order to effect noise removal;
said setting processing displaying a picture image that allows setting the sorts, order of use and the number of times of use of the noise filters and filter parameters; said noise removing processing being carried out based on input data;
said color grade number reducing processing receiving a contrast image freed of noise by said noise removing processing.

* * * * *

UNITED STATES PATENT AND TRADEMARK OFFICE
CERTIFICATE OF CORRECTION

| | |
|---|---|
| PATENT NO. | : 8,774,492 B2 |
| APPLICATION NO. | : 13/237472 |
| DATED | : July 8, 2014 |
| INVENTOR(S) | : Nikaido |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this
Thirteenth Day of October, 2015

Michelle K. Lee
*Director of the United States Patent and Trademark Office*